(12) United States Patent
Fukushima

(10) Patent No.: US 7,540,496 B2
(45) Date of Patent: Jun. 2, 2009

(54) SHEET CARRYING DEVICE WITH TILTED SKEW CORRECTION AND FORCE RELEASING CARRIERS

(75) Inventor: Kimitake Fukushima, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 548 days.

(21) Appl. No.: 11/189,760

(22) Filed: Jul. 27, 2005

(65) Prior Publication Data

US 2006/0022399 A1   Feb. 2, 2006

(30) Foreign Application Priority Data

Jul. 28, 2004   (JP)   ............... 2004-220474
Jun. 27, 2005   (JP)   ............... 2005-187126

(51) Int. Cl.
*B65H 9/04* (2006.01)
(52) U.S. Cl. ..................................... 271/253
(58) Field of Classification Search ............... 271/228, 271/253, 254
See application file for complete search history.

(56) References Cited

U.S. PATENT DOCUMENTS 5,195,736 A * 3/1993 Ishidate ..................... 271/22
6,168,153 B1 * 1/2001 Richards et al. ............. 271/227

FOREIGN PATENT DOCUMENTS

JP   2003-292198 A   10/2003
JP   2003292198 A * 10/2003

* cited by examiner

*Primary Examiner*—Patrick H Mackey
*Assistant Examiner*—Gerald W McClain
(74) *Attorney, Agent, or Firm*—Birch, Stewart, Kolasch & Birch, LLP

(57) ABSTRACT

After detecting an anterior end of a photosensitive material with a sensor, a controlling unit controls a release unit to release a nip of a carrying roller pair carrying the photosensitive material. The nip of the carrying roller pair is released in accordance with a length of the photosensitive material in a carrying direction thereof. It is possible to avoid applying a force of the carrying roller pair to a posterior end of the photosensitive material so that a skew-correction amount of a skew corrector is prevented from deteriorating. A skew of the photosensitive material is surely corrected relative to the carrying direction of the photosensitive material.

15 Claims, 15 Drawing Sheets

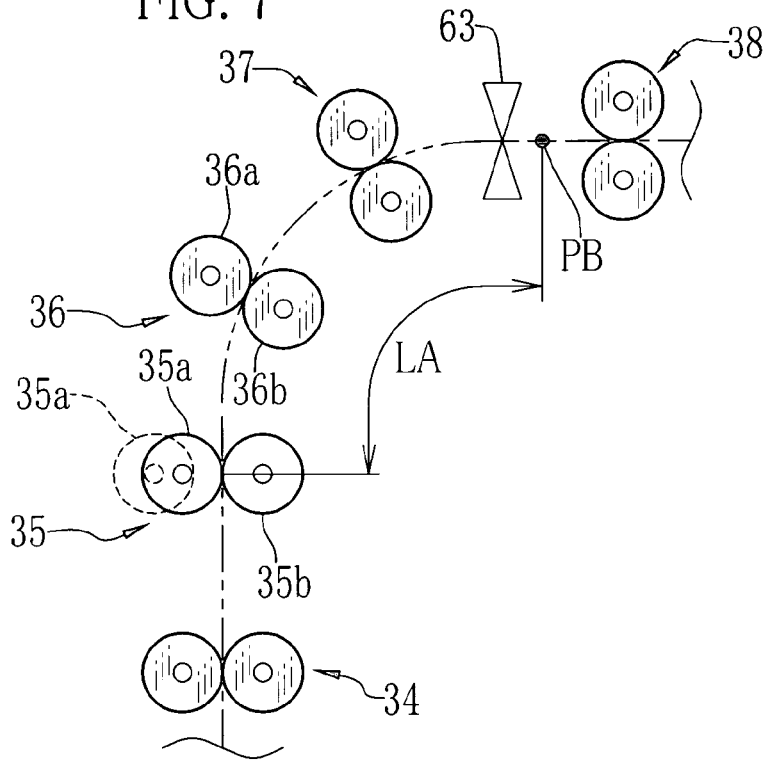
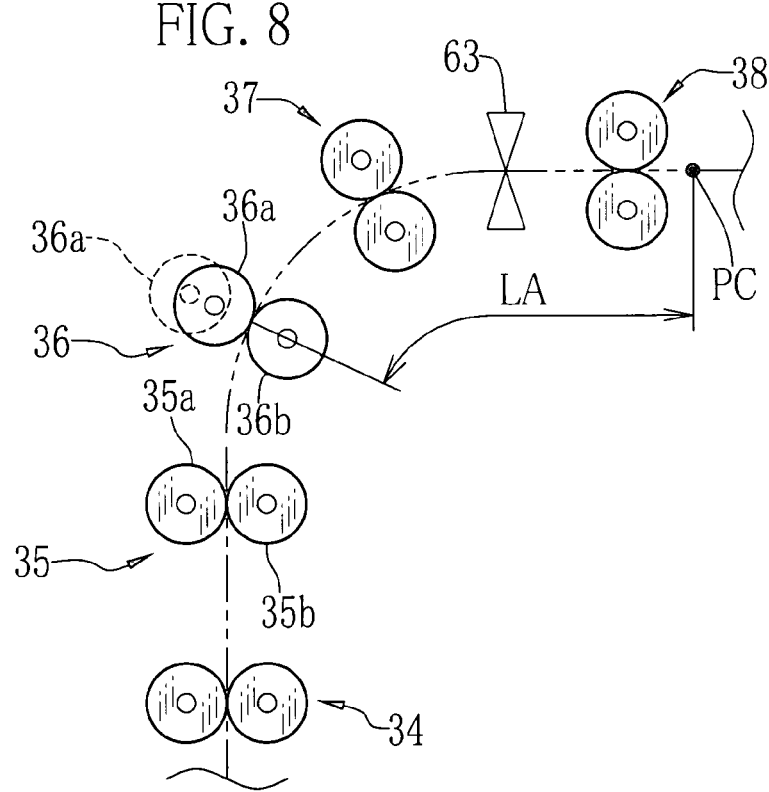

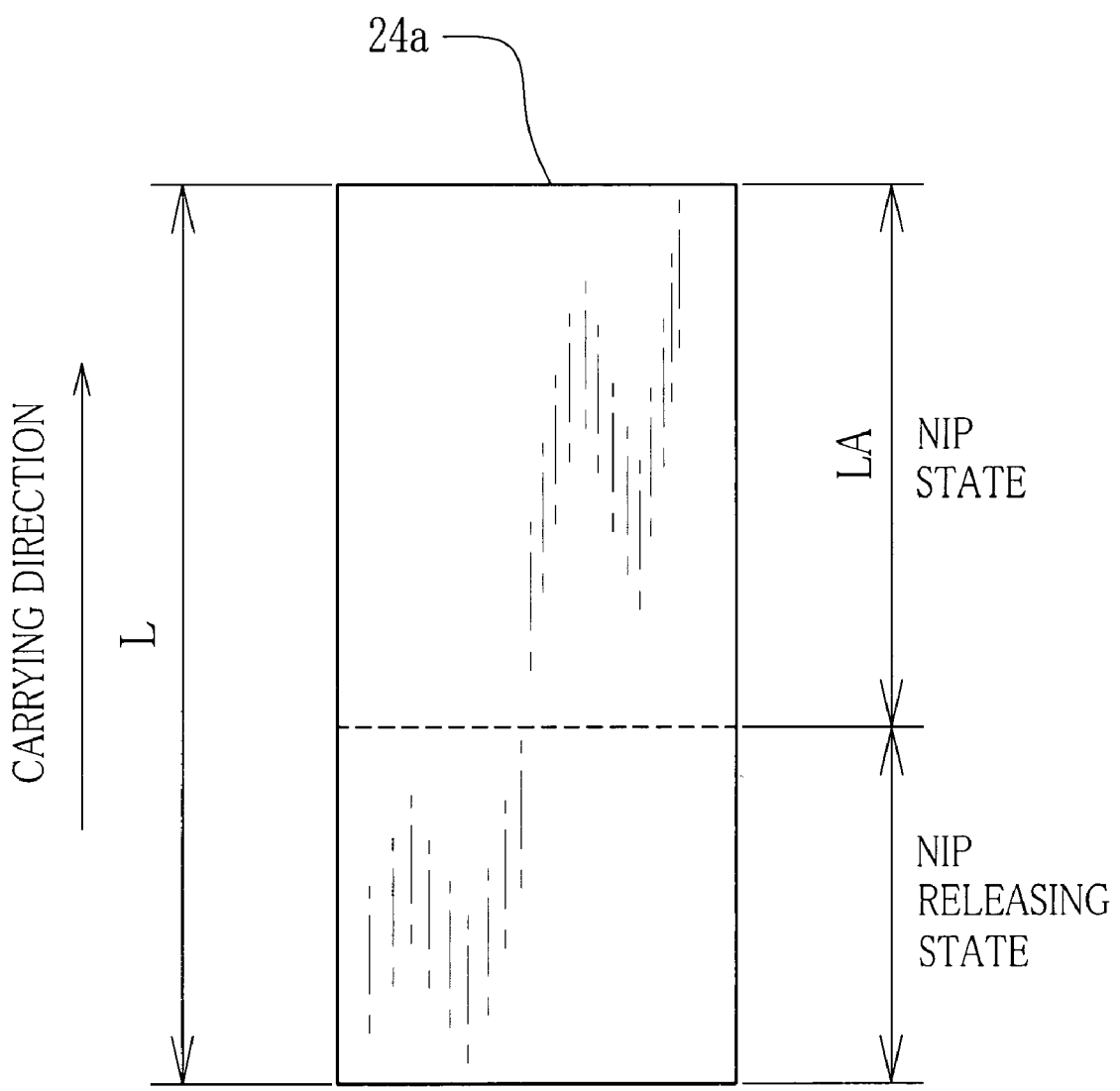

FIG. 10
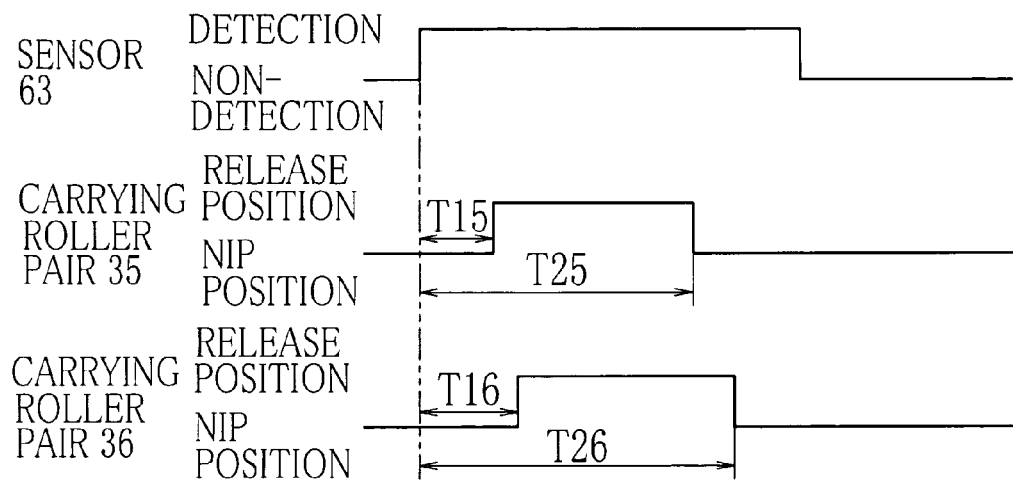
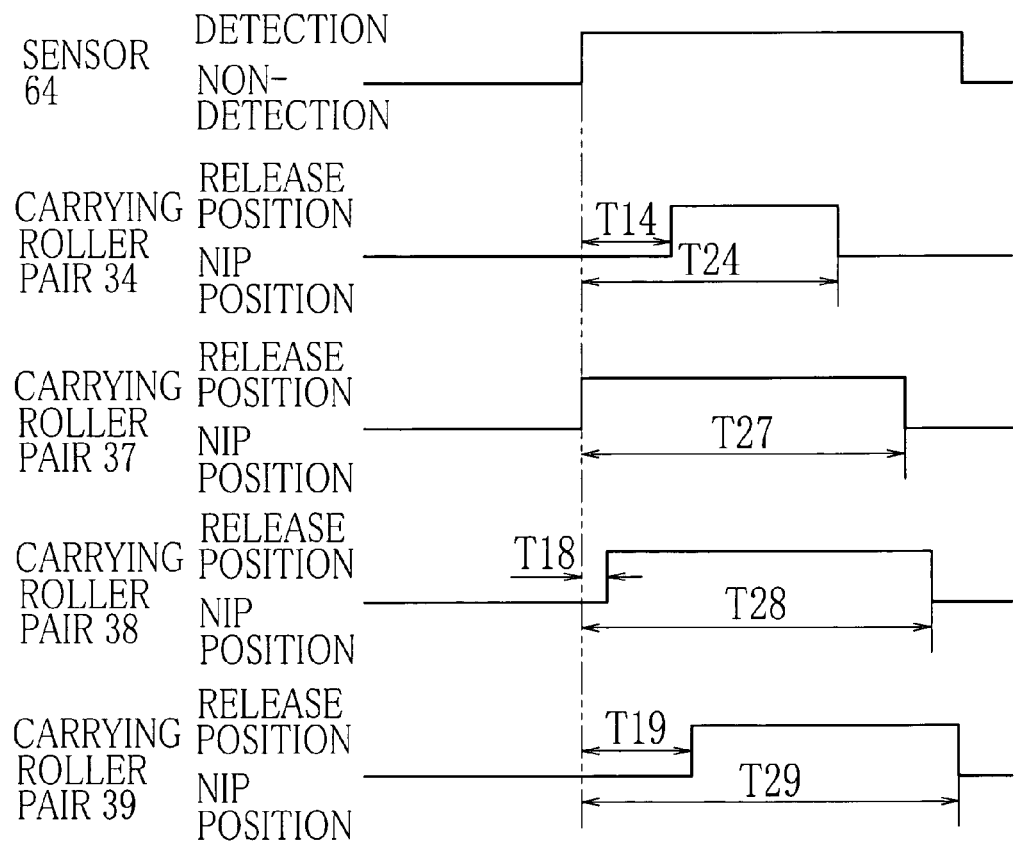

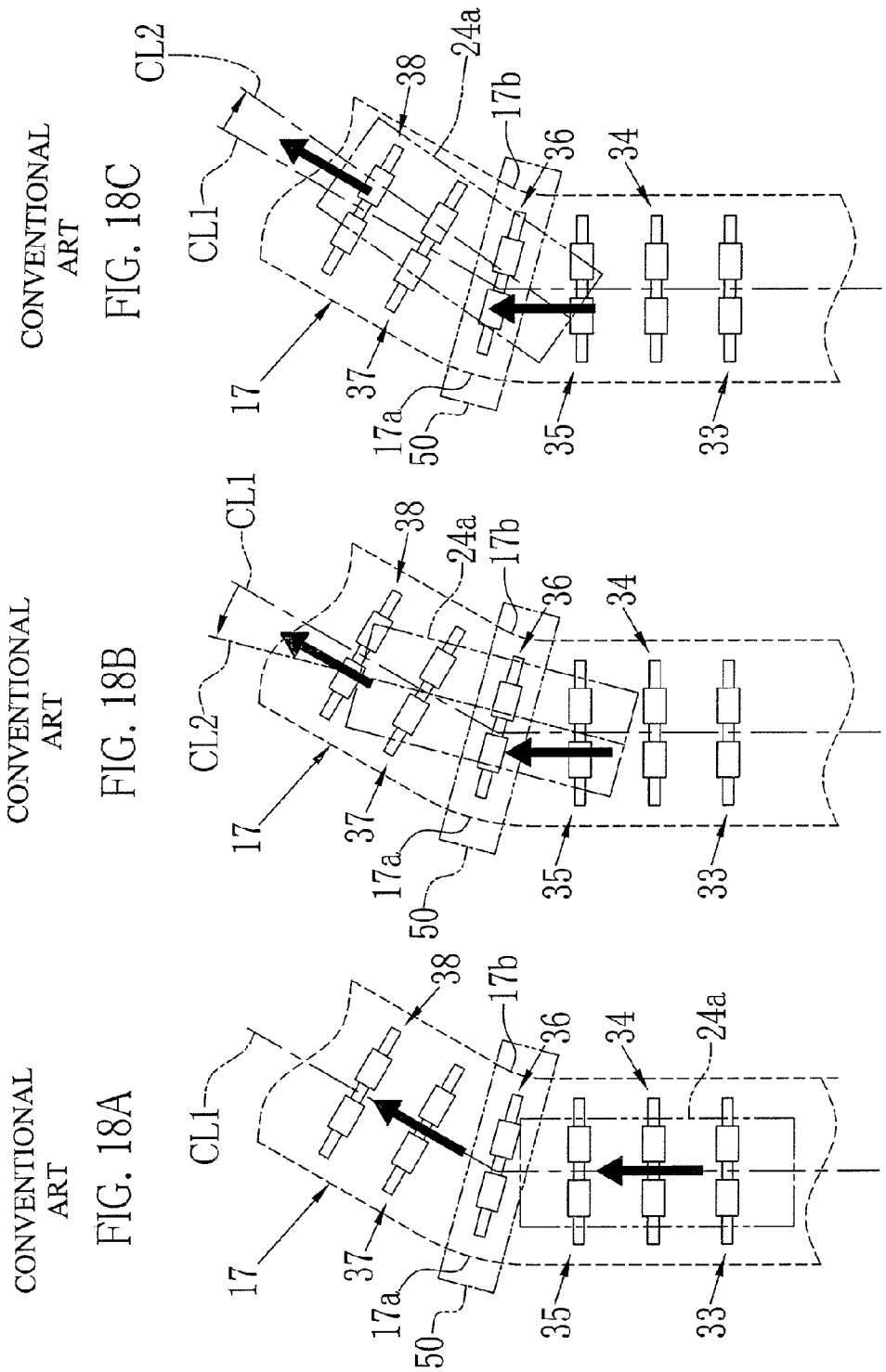

SHEET CARRYING DEVICE WITH TILTED SKEW CORRECTION AND FORCE RELEASING CARRIERS

BACKGROUND OF THE INVENTION

1. Field of the Invention

The present invention relates to a sheet carrying device in which a skew of a sheet carried along a passage is corrected relative to a carrying direction.

2. Description of the Related Art

It is known that there is a photographic printer in which an image taken in a negative film is recorded on a photosensitive material. In this kind of the photographic printer, a strip of the photosensitive material is cut into a predetermined length in accordance with a print size, and the photosensitive material being as a sheet is exposed to record the image. However, if an anterior end of the photosensitive material skews at a time when the photosensitive material is exposed to record the image, the photosensitive material is exposed in a state that the image inclines. Consequently, the image is recorded in a slant state. Thus, in order to obtain a proper photographic print, it is required to correct the skew of the photosensitive material and to feed the photosensitive material to an exposing unit in a correct state having no skew.

It is known that there is a sheet carrying device in which a carrying roller pair for nipping and carrying the photosensitive material is inclined from a reference position, which is parallel to a width direction of a passage, in a direction perpendicular to the passage for the purpose of solving the above problem (see Japanese Patent Laid-Open Publication No. 2003-292198, for example). By inclining the carrying roller pair, both ends of the passage in the width direction have different lengths to correct the skew of the photosensitive material.

In the sheet carrying device described in the above-noted Publication No. 2003-292198, a skew corrector 50 makes the lengths of both ends of the passage difference. FIGS. 18A to 18C are development views of the passage having the different lengths at both ends thereof. As shown in these drawings, the passage lengths are different at both ends 17a and 17b of the passage 17. In a case the passage length of the right end 17b is longer than that of the left end 17a, the center CL2 of the photosensitive material inclines relative to the center CL1 of the passage in a counterclockwise direction while the photosensitive material 24a is carried along the passage 17 from a position shown in FIG. 18A to a position shown in FIG. 18B.

However, force applied by carrying roller pairs 35 and 36 continues to act for a posterior end of the photosensitive material 24a. When the photosensitive material 24a has a long length in the carrying direction, the force applied by the carrying roller pairs 35 and 36 acts in a long time. Thus, the posterior end of the photosensitive material 24a is reversely pushed, and the center CL2 of the photosensitive material 24a inclines relative to the center CL1 of the passage in a reverse direction (clockwise direction), such as shown in FIG. 18C. Hence, there arises a problem in that it is impossible to correct the skew, since a skew-correction amount of the photosensitive material 24a corrected by the skew corrector 50 is reduced.

SUMMARY OF THE INVENTION

In view of the foregoing, it is a primary object of the present invention to provide a sheet carrying device in which a skew of a sheet is surely corrected regardless of a length of a sheet in a carrying direction.

In order to achieve the above and other objects, the sheet carrying device according to the present invention comprises a skew corrector, carriers, a first carrying-force changer and a controller. The sheet carrying device carries the sheet along a passage and corrects a skew of the sheet relative to the carrying direction. The skew corrector corrects the skew of the sheet by causing a difference between passage lengths of both ends of the passage in a width direction. The carriers are disposed at upstream and downstream sides of the skew corrector in the feeding direction to carry the sheet along the passage. The first carrying-force changer removes or reduces the carrying force to be applied to the sheet by the upstream carrier. After an anterior end of the sheet has reached the downstream carrier and the carrying force has been applied to the sheet, the controller controls the first carrying-force changer to remove or reduce at least a part of the carrying force of the upstream carrier.

The skew corrector comprises a carrying roller pair and a second carrying-force changer, which switches the carrying roller pair between a nip state and a nip-force releasing state to remove or reduce the carrying force to be applied to the sheet. It is preferable to make the passage lengths different at both ends of the passage in a width direction thereof by tilting the carrying roller pair on a plane, which is perpendicular to the passage, from a reference position being parallel to the width direction of the passage. Incidentally, the nip-force releasing state includes not only a separation state in that one of rollers constituting the carrying roller pair separates from the other roller, but also a state in that the nip force of the carrying roller pair nipping the sheet is zero or is smaller than the normal nip force. It is sufficient that the carrying force to be applied to the sheet by the carrying roller pair is removed or reduced.

In a preferred embodiment, the upstream carrier includes a plurality of carrying roller pairs for nipping and carrying the sheet, and the first carrying-force changer independently changes these carrying roller pairs between a nip state and a nip-force releasing state.

It is preferable that the controller controls the first and second carrying-force changers in accordance with a sheet length in the carrying direction so as to change the carrying roller pairs to be released in accordance with this sheet length.

As to the sheet, it is preferable to use a first sheet and a second sheet. The first sheet is frequently used, and a length of the second sheet in the carrying direction is longer than that of the first sheet. When the first sheet is carried, it is preferable that the first and second carrying-force changers avoid releasing the nip force of the carrying roller pairs.

After an anterior end of the second sheet has passed through the downstream carrier, it is preferable to sequentially set the carrying roller pairs of the upstream carrier in the nip-force releasing state. The carrying roller pair is set in the nip-force releasing state when a distance from the anterior end of the second sheet is equal to a reference length, which slightly exceeds the length of the first sheet in the carrying direction.

Further, it is preferable that the first and second carrying-force changers sequentially return the carrying roller pairs, which are kept in the nip-force releasing state, to the nip state. The carrying roller pair is returned to the nip state when a posterior end of the sheet has passed through this carrying roller pair.

In the sheet carrying device according to the present invention, the carrying force of the upstream carrier is removed or reduced after the anterior end of the sheet has reached the downstream carrier and the carrying force has been applied to the sheet. Thus, in particular, when the length of the sheet in the carrying direction is long, it is possible to prevent the carrying force of the upstream carrier from being applied to the posterior end of the sheet so that a skew-correction amount of the sheet to be corrected by the skew corrector is prevented from reducing. Therefore, the skew of the sheet is surely corrected regardless of the sheet length in the carrying direction.

Since the skew corrector comprises the carrying roller pair and the second carrying-force changer, it is possible to prevent the carrying force of the carrying roller pair from being applied to the posterior end of the sheet by setting the carrying roller pair in the nip-force releasing state after the anterior end of the sheet has reached the downstream carrier and the carrying force has been applied to the sheet. Thus, it is possible to avoid reducing the skew-correction amount of the sheet to be corrected by the skew corrector.

The sheet carrying device of the present invention has the following advantages. The carrying force to be applied to the posterior end of the sheet is easily controlled. Only the carrying roller pair affecting the skew-correction amount of the sheet is kept in the nip-force releasing state. It is unnecessary to release the nip force in the case that the carrying roller pair does not affect the skew-correction amount of the sheet. Thus, vain control is avoided. It is possible to maintain a continuity of skew-correction properties at an approximate position of the reference length.

BRIEF DESCRIPTION OF THE DRAWINGS

The above objects and advantages of the present invention will become apparent from the following detailed description of the preferred embodiments of the invention when read in conjunction with the accompanying drawings, in which:

FIG. 7 is an explanatory illustration showing timing for releasing a nip of the carrying roller pair;

FIG. 8 is an explanatory illustration showing timing for releasing a nip of the carrying roller pair;

FIG. 9 is an explanatory illustration showing a nip region and a nip release region of the photosensitive material;

FIG. 10 is a timing diagram for explaining a nip-releasing process;

FIGS. 18A, 18B and 18C are explanatory illustrations showing inclination of the photosensitive material in a case that the nip of the carrying roller pair is not released.

DETAILED DESCRIPTION OF THE PREFERRED EMBODIMENT(S)

Figure 1:
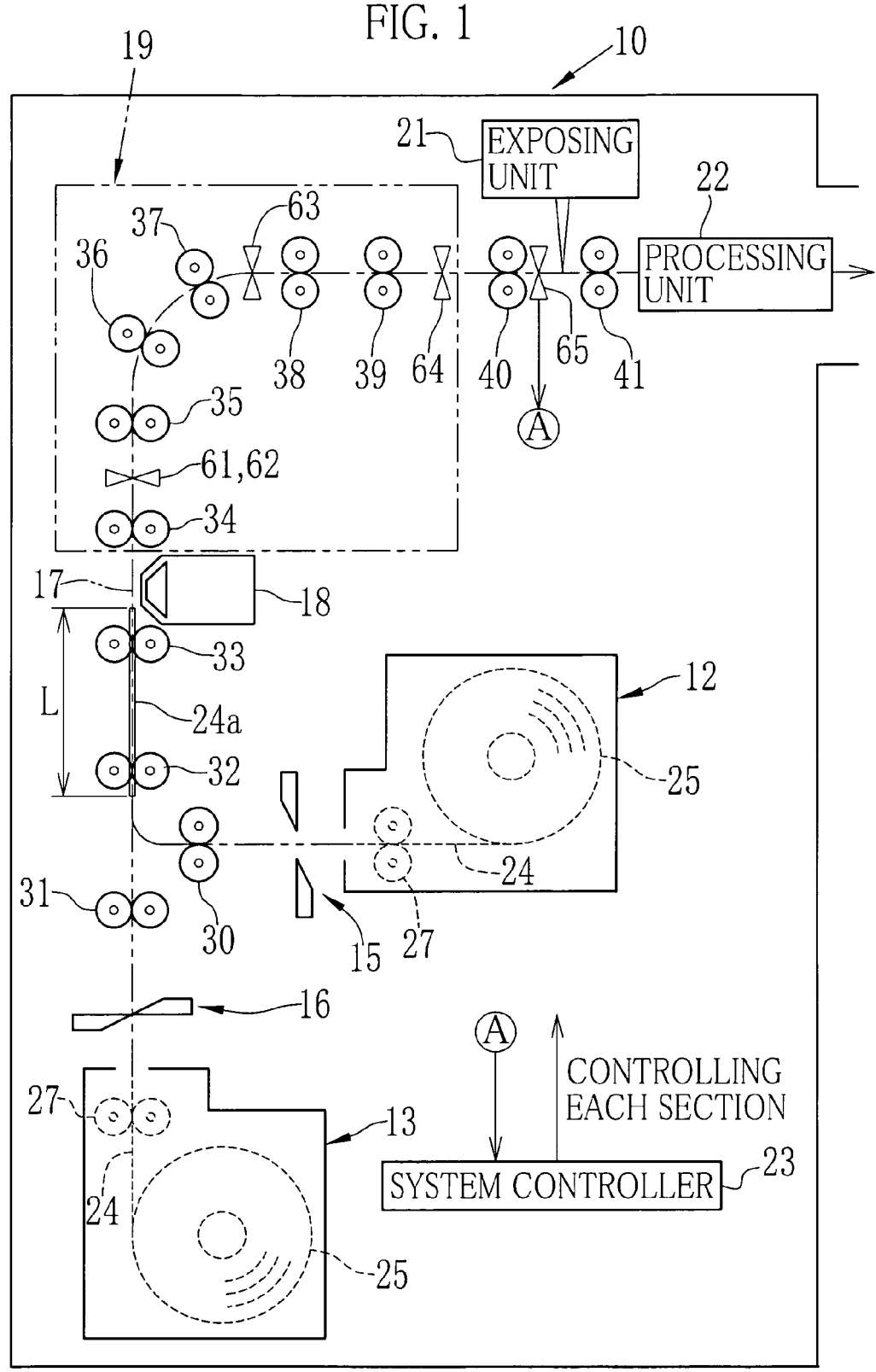
FIG. 1 is a schematic side view showing a structure of a photographic printer.

FIG. 1 is a schematic side view of a photographic printer 10 employing a sheet carrying device according to the present invention. As shown in FIG. 1, the photographic printer 10 is constituted of magazines 12 and 13, cutters 15 and 16, a back-printing unit 18, a carrying device 19 for a sheet, an exposing unit 21, a processing unit 22, a system controller 23 and so forth.

The magazines 12 and 13 respectively contain a roll 25 taking up a strip of a photosensitive material 24 in a roll form. The magazines 12 and 13 are set to predetermined positions of the photographic printer 10. The inside of the respective magazines 12 and 13 is provided with a paper-feed roller pair 27 to be rotated by a motor not shown. Upon rotation of the paper-feed roller pair 27, the photosensitive material 24 is drawn out of the respective magazines 12 and 13. At a downstream side of the magazine 12, the cutter 15 and a carrying roller pair 30 are disposed. At a downstream side of the magazine 13, the cutter 16 and a carrying roller pair 31 are disposed.

The photosensitive material 24 drawn out of the magazine 12 is cut by the cutter 15 into a predetermined length in accordance with a print size to produce a cut-sheet-shaped photosensitive material 24a being as the sheet. After that, the photosensitive material 24a is nipped by the carrying roller pair 30 and is carried along a passage 17 shown by a chain double-dashed line in the drawing. Similarly, the photosensitive material drawn out of the magazine 13 is cut by the cutter 16 into the predetermined length in accordance with the print size to produce the cut-sheet-shaped photosensitive material 24a. After that, the photosensitive material 24a is nipped by the carrying roller pair 31 and is carried along the passage 17. Incidentally, the passage 17 is constituted of guide members not shown. The photosensitive material 24a is guided by the guide members when carried.

The back-printing unit 18 and carrying roller pairs 32 and 33 are disposed at a downstream side of the carrying roller pairs 30 and 31. The photosensitive material 24a forwarded from the respective magazines 12 and 13 is carried by the carrying roller pairs 32 and 33 to the back-printing unit 18 along the passage 17. In the back-printing unit 18, information concerning film ID, a frame number and so forth are printed on a rear surface of the photosensitive material 24a (opposite surface to a recording surface).

The carrying device 19 is disposed at a downstream side of the back-printing unit 18. The photosensitive material 24a, for which back-printing has been performed, is carried to the exposing unit 21 by the carrying device 19. As described later, the carrying device 19 carries the photosensitive material 24a to the exposing unit 21, correcting a skew of the photosensitive material 24a in a carrying direction thereof.

Carrying roller pairs 40 and 41 are disposed at a downstream side of the carrying device 19. The exposing unit 21 is disposed at a position confronting the passage 17 between the carrying roller pairs 40 and 41. The exposing unit 21 comprises a laser printer and an image memory, which are well known. The image memory stores image data read by a film scanner not shown.

The exposing unit 21 performs scanning exposure for the photosensitive material 24a, which is carried in a sub-scanning direction (feeding direction) by the carrying roller pairs 40 and 41, on the basis of the image data stored in the image memory. The scanning exposure is performed in a main-scanning direction perpendicular to the sub-scanning direction to record a latent image by printing the image on the photosensitive material 24a. Meanwhile, between the carrying roller pairs 40 and 41, a sensor 65 is disposed at an upstream side of an exposure position. The sensor 65 is a photointerruptor, which comprises a light emitter and a light receiver to detect an object, which interrupts the light. Incidentally, as to the light emitter, an infrared type is used so as not to affect the exposure.

The system controller 23 obtains a detection signal at a moment when an anterior end of the photosensitive material 24a has been detected by the sensor 65. And then, on the basis of a carrying speed, the system controller 23 calculates a time when the photosensitive material 24a arrives the exposure position. The system controller 23 controls the exposing unit 21 in accordance with the calculated time to commence the scanning exposure.

The exposed photosensitive material 24a is carried to the processing unit 22. After performing processes of coloring, developing/fixing and washing in the processing unit 22, the photosensitive material 24a is dried and is discharged to the outside of the photographic printer 10 as a photographic print. By the way, the exposed photographic materials 24a may be carried to the processing unit 22 in sorted plural rows.

Figure 2:
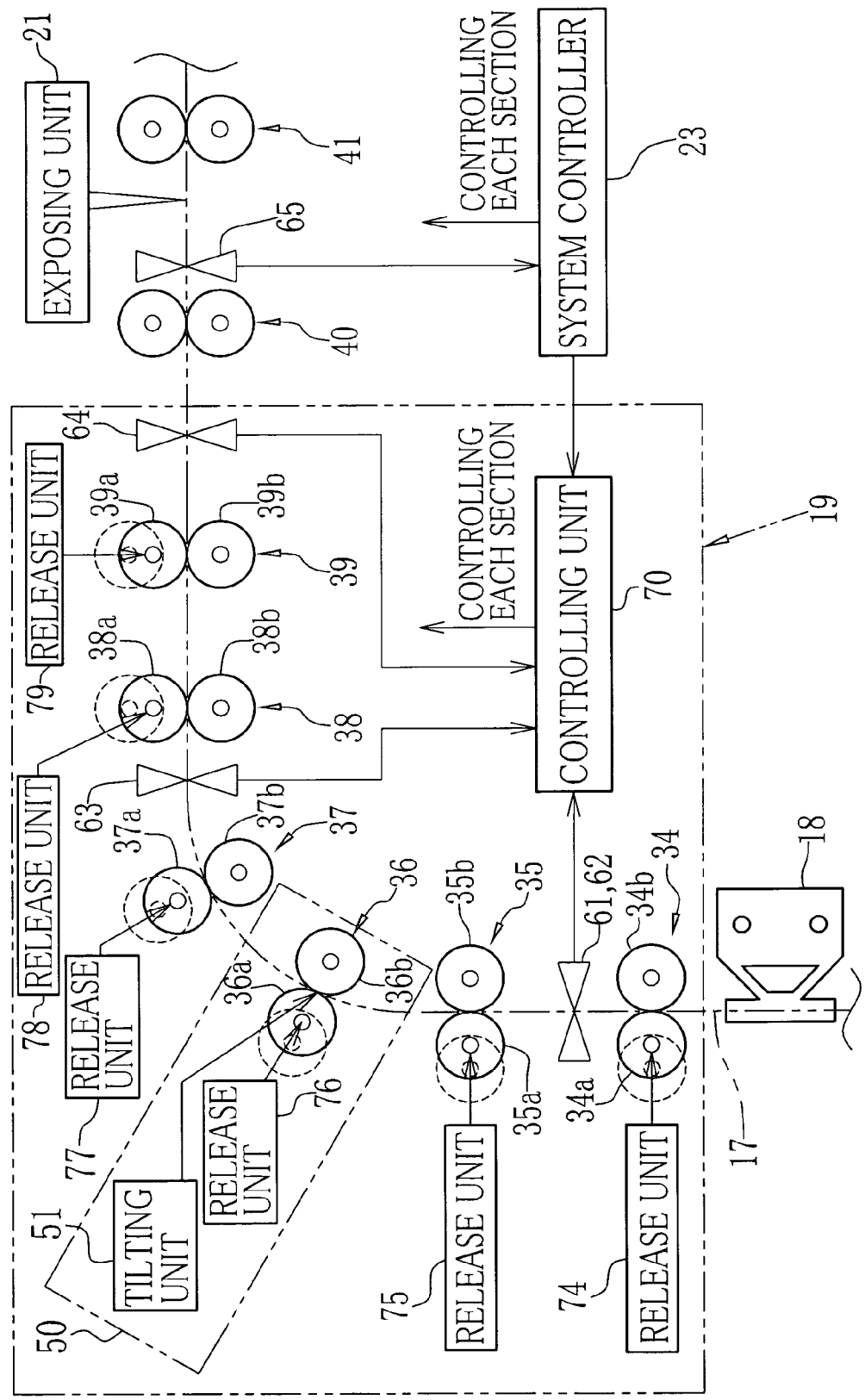
FIG. 2 is a schematic side view showing a structure of a carrying device.

Next, the carrying device 19 is described below. FIG. 2 is a schematic side view of the carrying device 19 comprising five carrying roller pairs (carriers) 34, 35 and 37 to 39, a skew corrector 50 for correcting a skew, four sensors 61 to 64, and a controlling unit 70 for controlling the whole of the carrying device 19. The carrying roller pairs 34, 35 and 37 to 39 are nip rollers for nipping and carrying the photosensitive material 24a. These carrying roller pairs are disposed at a downstream side of the back-printing unit 18 along the passage 17 in order.

The passage 17 curves at 90 degrees in an arc shape between the carrying roller pairs 35 and 38. The carrying roller pair 37 is disposed at a curving portion. The skew corrector 50 is also disposed at the curving portion so as to be located at an upstream side of the carrying roller pair 37.

The skew corrector 50 comprises a carrying roller pair 36 such as described later. The carrying roller pair 36 is tilted from a reference position, which is parallel to a width direction of the passage 17, on a plane perpendicular to the passage 17. Tilting the carrying roller pair 36 causes a difference between passage lengths of both ends of the passage 17 in the width direction thereof to correct the skew of the photosensitive material 24a.

The skew corrector 50 and the five carrying roller pairs 34, 35 and 37 to 39 are disposed such that intervals of the adjacent pairs of the carrying roller pairs 34 to 39 are about 60 mm. However, the interval of the adjacent carrying roller pairs is not limited to 60 mm on condition that the interval is shorter than the shortest feed length (length in the carrying direction) L of the photosensitive materials 24a to be printed by the photographic printer 10.

Further, the carrying roller pairs 34 to 39 are adapted to have a width for nipping the photosensitive material 24a, namely a roller width W (see FIG. 6), which is narrower than the shortest paper width to be printed by the photographic printer 10. For instance, in a case that the shortest paper width to be printed by the photographic printer 10 is 89 mm, the roller width W is adapted to be about 78 mm.

The following is the reason for making the roller width W narrower than the shortest paper width such as described above. In case that the roller width W is longer than the shortest width size of the photosensitive material 24a, the width of the carrying roller pair for nipping the photosensitive material 24a changes relative to the photosensitive materials 24a having the different width sizes.

Moreover, in the case that the roller width W is longer than the shortest width size of the photosensitive material 24a, even if the photosensitive material 24a inclines at the same angle and in the same direction, the photosensitive material 24a having the longer width reaches the carrying roller pair early when entering the carrying roller pair. Thus, periods and positions for applying a force of the carrying roller pair to the photosensitive material 24a become different.

Further, if the width of the photosensitive material 24a is narrower than the roller width W, the side edge of the photosensitive material 24a is pressed by the roller. Since a surface of the roller is formed from an elastic material of rubber and so forth, the roller surface is partially deformed near the side edge of the photosensitive material 24a. Due to this, the photosensitive material 24a is unexpectedly curved.

From the above reasons, if the roller width W is longer than the shortest width size of the photosensitive material 24a, skew-correction properties of the photosensitive material 24a change every width size when the skew of the photosensitive material 24a is corrected by the skew corrector 50. In consideration of this, the roller width W is shorter than the shortest width size of the photosensitive material 24a for the purpose of preventing the skew correction of the photosensitive material 24a from being affected by the width size.

Figure 3:
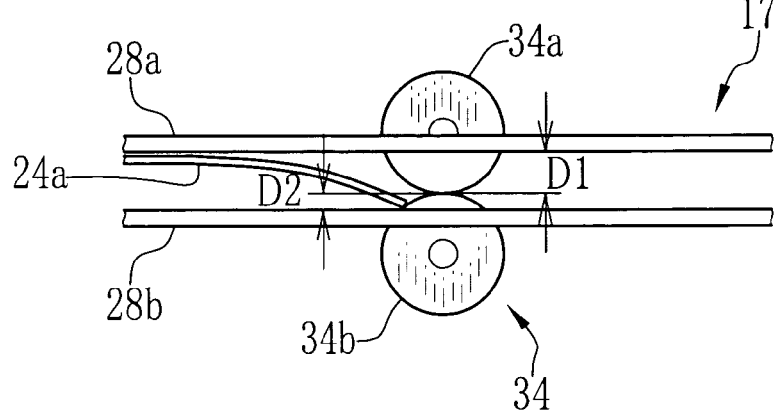
FIG. 3 is a schematic side view showing a protrusion amount of a carrying roller pair relative to a plane portion of a passage.

In the meantime, the photosensitive material 24 of the roll 25 is taken up in a state that a recording surface (emulsion surface) thereof faces the outside. Thus, the photosensitive material 24a drawn out of the respective magazines 12 and 13 is carried along the passage 17, keeping a curved shape in which the recording surface faces the outside. Consequently, when the anterior end of the photosensitive material 24a comes into contact with a roller 34b, greater impact is caused. In view of this, such as shown in FIG. 3, guide members 28a and 28b constituting the passage 17 have a wider space at a recording-surface side of the photosensitive material 24a and have a narrower space at a rear-surface side thereof.

In other words, a protrusion amount D1 of a roller 34a is greater than a protrusion amount D2 of the roller 34b. The protrusion amount D1 is a distance between the guide member 28a and a nip surface of the roller 34a of the recording-surface side. The protrusion amount D2 is a distance between the guide member 28b and a nip surface of the roller 34b of the rear-surface side. In virtue of this, when the anterior end of the photosensitive material 24a comes into contact with the roller 34b, an impact is reduced. Thus, it is possible to prevent the recording surface from being scratched, and stability of carrying may be secured. Incidentally, although only the carrying roller pair 34 is described, the other carrying roller pairs disposed along the passage 17 similarly have the protrusion amount D1 being greater than the protrusion amount D2.

Figure 4:
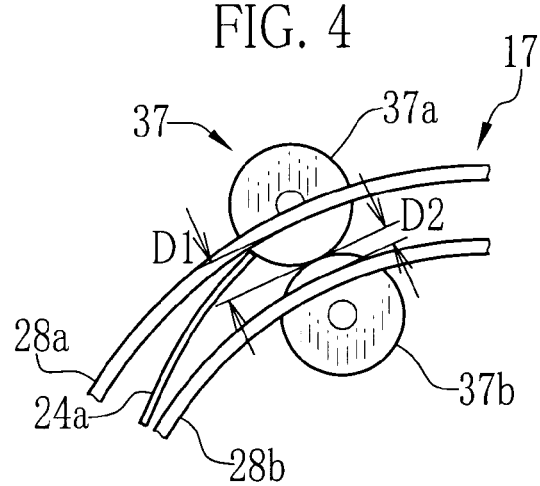
FIG. 4 is a schematic side view showing an anterior-position of a photosensitive material, which is related to the protrusion amount of the carrying roller pair, at a curving portion of the passage.

Meanwhile, the photosensitive material 24a is carried along the curving portion of the passage 17, sliding on the outside guide member 28a. If the protrusion amount D1 of the roller 37a, which is disposed at the outside of the curving portion, is greater than the protrusion amount D2 of the roller 37b, which is disposed at the inside (rear-surface side), such as shown in FIG. 4, the anterior end of the photosensitive material 24a strongly comes into contact with the roller 37a. Due to this, scratches are caused on the recording surface of the photosensitive material 24a, and carrying accuracy of the photosensitive material 24a deteriorates.

Figure 5:
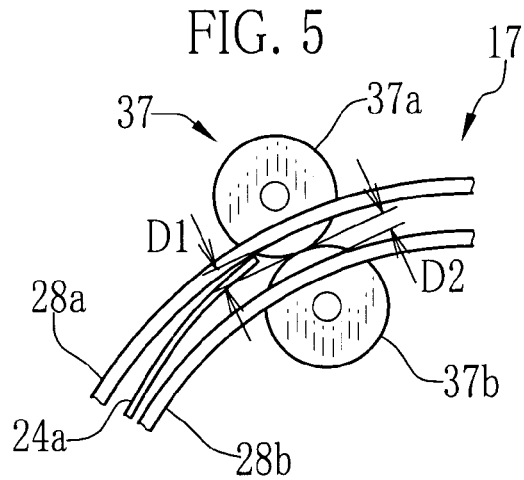
FIG. 5 is a schematic side view showing the protrusion amount of the carrying roller pair at the curving portion of the passage.

In view of this, such as shown in FIG. 5, the protrusion amount D1 of the roller 37a is adapted to be smaller than the protrusion amount D1 of the carrying roller pairs disposed at the plane portion. By virtue of this, an impact is reduced when the anterior end of the photosensitive material 24a comes into contact with the roller 37a. Consequently, it is possible to prevent the recording surface from being damaged. Further, it is possible to prevent the carrying accuracy from deteriorating. Incidentally, although only the carrying roller pair 37 is described, the carrying roller pair 36 disposed at the curving portion similarly has the smaller protrusion amount D1 in comparison with the carrying roller pairs disposed at the plane portion.

As shown in FIG. 2, the sensors 61 and 62 are disposed at the passage 17 between the carrying roller pairs 34 and 35. The sensors 61 and 62 are arranged at a predetermined interval in the width direction of the passage 17 (in the main-scanning direction of the exposing unit 21). Similarly to the sensor 65, the sensors 61 and 62 are photointerruptors to detect the photosensitive material, which resides on the passage 17, at the respective arrangement positions.

When the photosensitive material 24a is carried with a skew relative to the carrying direction, either of the sensors 61 and 61 detects the anterior end first, and the other of them detects the anterior end secondarily. Since the carrying speed and the interval between the sensors 61 and 62 are known in advance, the controlling unit 70 calculates a skew direction and a skew angle of the photosensitive materials 24a relative to the carrying direction on the basis of a detection order and a time difference of the anterior end detected by the sensors 61 and 62. Incidentally, the skew direction of the anterior end of the photosensitive material 24a may be calculated relative to the main-scanning direction.

The sensor 63 is disposed at the passage 17 between the carrying roller pairs 37 and 38. The sensor 64 is disposed at the passage 17 of a downstream side of the carrying roller pair 39. Similarly to the sensors 61 and 62, the sensors 63 and 64 are photointerruptors to detect the photosensitive material 24a, which resides on the passage 17, at the respective arrangement positions.

The carrying roller pairs 34, 35, 37 to 39 are respectively provided with release units 74, 75, 77 to 79 one by one, each of which is regarded as a first carrying-force changer. The carrying roller pair 36 of the skew corrector 50 is also provided with a release unit 76 being as a second carrying-force changer. Rollers 34a to 39a of the carrying roller pairs 34 to 39 are respectively moved by the release units 74 to 79 between a nip position (shown by a solid line in the drawing) and a release position (shown by a dotted line). The rollers 34a to 39a nip the photosensitive material 24a at the nip position and move from the nip position to the release position to release the nip.

The release units 74 to 79 comprise a solenoid constituted of a magnet coil and an iron core, for example. By electrifying the solenoid, one roller of the carrying roller pair is moved from the nip position to the release position to release the nip. By the way, the release units 74 to 79 may move two rollers of the respective carrying roller pairs from nip positions to evacuation positions to release the nip.

The respective carrying roller pairs 34 to 39 are driven by a motor not shown. The motor is connected to and controlled by the controlling unit 70 to carry the photosensitive material 24a along the passage 17. The release units 74 to 79 and the sensors 61 to 64 are similarly connected to the controlling unit 70, which controls the release units 74 to 79 on the basis of the detection signals of the sensors 61 to 64, such as described later.

Figure 6:
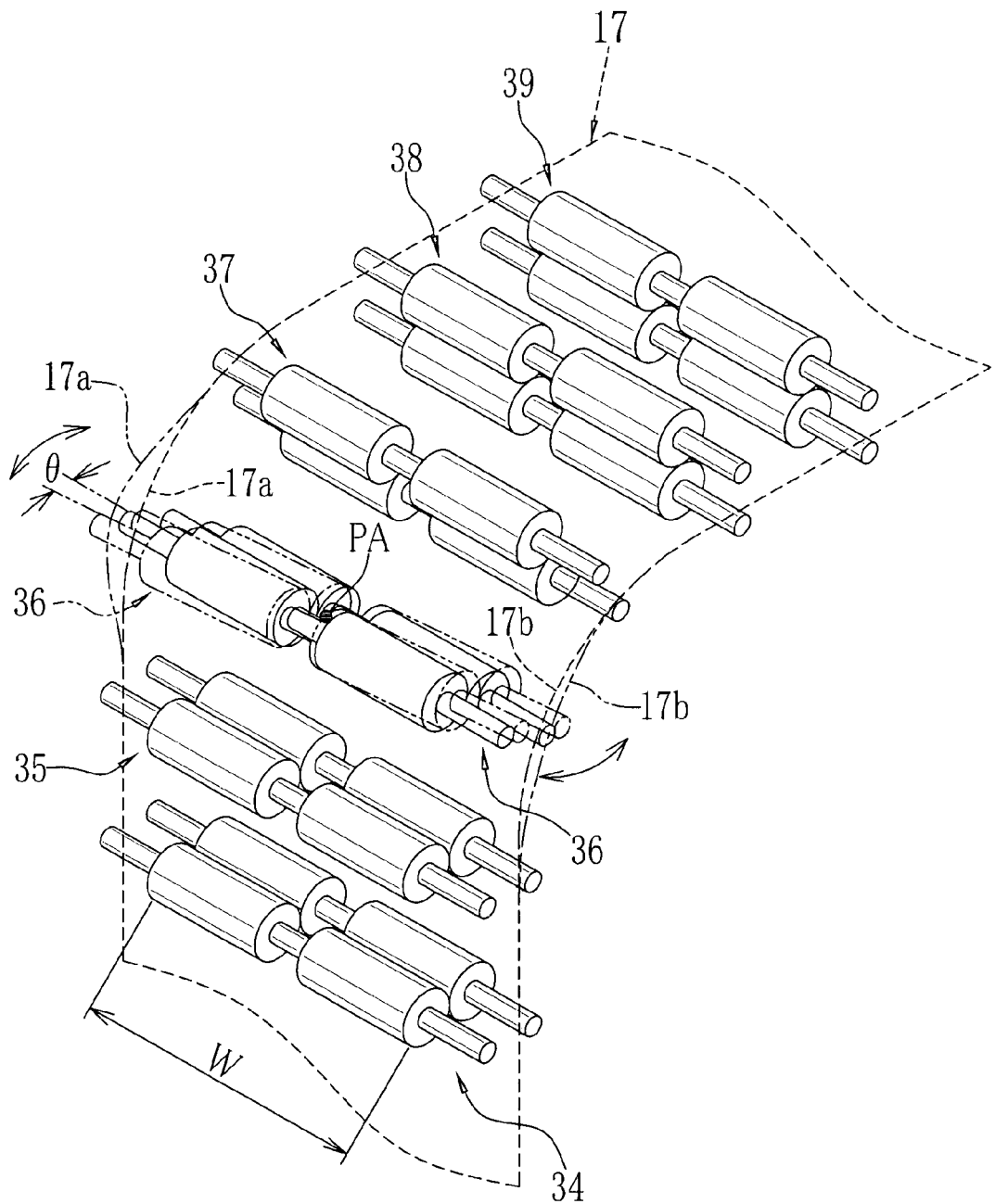
FIG. 6 is a perspective view showing a change of a passage length caused by a tilt of the carrying roller pair.

The skew corrector 50 comprises a tilting unit 51, the carrying roller pair 36 and the release unit 76 being as the second carrying-force changer. The tilting unit 51 comprises a tilt driving motor and a tilt driving cam, which are not shown. The tilt driving motor rotates the tilt driving cam by which the carrying roller pair 36 is rotated around a fulcrum PA on a plane perpendicular to the passage 17, such as shown in FIG. 6. The carrying roller pair 36 tilts from a reference position (shown by a solid line in FIG. 6), which is parallel to the width direction of the passage 17.

When the carrying roller pair 36 tilts from the position shown by the solid line to a position shown by a chain double-dashed line, both ends 17a and 17b of the passage 17 in the width direction thereof move from a position shown by dotted lines to a position shown by chain double-dashed lines. At this time, the left end 17a moves toward the outside of the curving portion, so that a passage length becomes longer. In contrast, the right end 17b moves toward the inside of the curving portion, so that a passage length becomes shorter. Thus, the passage length of the left end 17a becomes longer than the passage length of the right end 17b. Meanwhile, when the carrying roller pair 36 tilts in a reverse direction to the above-mentioned direction, the passage length of the right end 17b becomes longer than the passage length of the left end 17a.

When the passage lengths of both ends of the passage 17 are different such as described above, the carried photosensitive material 24a is skewed. In other words, by tilting the carrying roller pair 36 to a position where the skew of the photosensitive material is corrected in the carrying direction, it is possible to correct the skew of the photosensitive material 24a. As described above, the controlling unit 70 calculates the skew direction and the skew angle of the photosensitive material 24a relative to the carrying direction on the basis of the detection signals of the sensors 61 and 62. Based on the calculation result, the skew corrector 50 is controlled to correct the skew of the photosensitive material 24a.

In this way, the skew corrector 50 corrects the skew of the photosensitive material 24a relative to the carrying direction so that the anterior end of the photosensitive material 24a becomes parallel to the main-scanning direction of the exposing unit 21 disposed at the downstream side. In virtue of this, it is possible to prevent an image to be recoded from skewing and shifting when the image is printed on the photosensitive material 24a by the exposing unit 21.

However, when the skew corrector 50 corrects the skew of the photosensitive material 24a, it is difficult to correct the skew of the photosensitive material 24a if the feed length L of the photosensitive material 24a is long. This is because the posterior end of the photosensitive material 24a is pushed by the carrying roller pairs 35 and 36 so as to cause a skew of the photosensitive material 24a, such as shown in FIG. 18. In consideration of this, after the anterior end of the photosensitive material 24a has been nipped by the carrying roller pair 37, the carrying device 19 releases the nips of the carrying roller pairs 35 and 36, which are disposed at the upstream side of the carrying roller pair 37, to avoid affecting the skew correction of the skew corrector 50.

A nip-releasing process is described below. In this embodiment, the sensor 63 is disposed between the carrying roller pairs 37 and 38 such as described above. After detecting the anterior end of the photosensitive material 24a with the sensor 63, the controlling unit 70 controls the release units 75 and 76 to release the nips of the carrying roller pairs 35 and 36 in this order. The carrying roller pair through which the posterior end of the photosensitive material 24a has passed is returned to the nip position in order.

The nip of the carrying roller pair 34 is not released. Since the carrying roller pair 34 is disposed at the nearest position of the back-printing unit 18, printing is slantingly performed if the nip is released. When the nip of the carrying roller pair 34 is not released, the carrying roller pair 34 applies a force to the photosensitive material 24a. However, since a distance from the skew corrector 50 is long, the photosensitive material 24a sags so that the force is absorbed. Therefore, the nip of the carrying roller pair 34 may not be released because the skew correction of the photosensitive material 24a is not affected. In another way, the nip may be belatedly released.

As to the feed length L of the photosensitive material 24a, a size thereof most frequently used is within a range of 80 mm to 152 mm. In a case using the photosensitive material 24a whose feed length L is 152 mm or less, the carrying roller pairs 35 and 36 apply the force to the photosensitive material 24a in a short time. Thus, the skew-correction properties of the skew corrector 50 are hardly affected. By increasing the tilt angle of the carrying roller pair 36, it is possible to correct the skew of the photosensitive material 24a relative to the carrying direction without releasing the nip of the carrying roller pairs 35 and 36. By contrast, in a case using the photosensitive material 24a whose feed length L is longer than 152 mm, the force applied to the photosensitive material 24a by the carrying roller pairs 35 and 36 affects the skew-correction properties greatly. For this reason, the nip is released.

On the ground of the above, the controlling unit 70 obtains information concerning the feed length L of the photosensitive material 24a from the system controller 23, and the controlling unit 70 changes the carrying roller pairs to be nip-released in accordance with the feed length L by controlling the release units 75 and 76 on the basis of the feed length L. In other words, when the feed length L of the photosensitive material 24a is less than a set reference length LA, the nip-releasing process is not performed. When the feed length L is longer than the reference length LA, the nip-releasing process is performed.

Hereinafter, is described a case in that the reference length LA is set to 155 mm. As shown in Table 1, the feed length L is divided into three ranges. The first range is less than 155 mm. The second range is 155 mm or more and is less than 218 mm. The third range is 218 mm or more. The carrying roller pair to be nip-released is changed in accordance with the range of the feed length L.

When the feed length L is less than 155 mm, the skew-correction properties are hardly affected by the carrying roller pairs 35 and 36, such as described above. Thus, the nips of the carrying roller pairs 35 and 36 are not released. When the feed length L is 155 mm or more and is less than 218 mm, the force of the carrying roller pair 35 is applied to the photosensitive material 24a in a short time after the anterior end of the photosensitive material 24a has reached the skew corrector 50. Consequently, the carrying roller pair 35 hardly affects the skew-correction properties. In consideration of this, only the nip of the carrying roller pair 36 is released.

When the feed length L is 218 mm or more, the carrying roller pairs 35 and 36 greatly affect the skew-correction properties. Thus, the nips of the respective carrying roller pairs 35 and 36 are released. As described above, in the respective ranges of the feed length L, the nip is released regarding only the carrying roller pair affecting the skew-correction properties of the photosensitive material 24a. Incidentally, the ranges of the feed length L are not limited to the above-noted ranges, and may be changed on the basis of the interval of the adjacent carrying roller pairs.

After the anterior end of the photosensitive material 24a has passed the carrying roller pair 37, the nip of the carrying roller pair 35 is released when the distance between the anterior end and the carrying roller pair 35 is the reference length LA (155 mm), such as shown in FIG. 7. In other words, the nip of the carrying roller pair 35 is released when the anterior end of the photosensitive material 24a has reached a position PB where the distance from the carrying roller pair 35 is 155 mm.

Further, after the anterior end of the photosensitive material 24a has passed the carrying roller pair 37, the nip of the carrying roller pair 36 is released when the distance between the anterior end and the carrying roller pair 36 is the reference length LA (155 mm), such as shown in FIG. 8. In other words, the nip of the carrying roller pair 36 is released when the anterior end of the photosensitive material 24a has reached a position PC where the distance from the carrying roller pair 36 is 155 mm.

As shown in FIG. 9, when the feed length L of the photosensitive material 24a is 155 mm or more, an area extending from the anterior end of the photosensitive material 24a by 155 mm is nipped and carried by the carrying roller pairs 35 and 36. However, a remaining area extending to the posterior end is carried in the state that the nips of the carrying roller pairs 35 and 36 are released.

When the feed length L is less than 155 mm, for example, when the feed length L is 152 mm, the entire area of the photosensitive material 24 is nipped and carried by the carrying roller pairs 35 and 36.

As the feed length L becomes longer, the force of the carrying roller pairs 35 and 36 is applied to the photosensitive material 24a in a longer time, and the skew-correction properties of the skew corrector 50 is more affected. As described above, however, when the feed length L of the photosensitive material 24a is 155 mm or more, the carrying roller pairs 35 and 36 release the nip at the position separating from the anterior end of the photosensitive material by 155 mm. Thus, continuity of the skew-correction property is maintained at the approximate position of the reference length LA.

Further, in the case the feed length L of the photosensitive material 24a is 155 mm or more, the force of the carrying roller pairs 35 and 36 is applied to the photosensitive material 24a during the same time even if the feed length L changes. Consequently, the feed length L hardly affects the skew-correction properties.

TABLE 1

| Length L (mm) | Carrying Roller Pair to be nip-released |
| --- | --- |
| L < 155 | None |
| 155 ≦ L < 218 | Carrying Roller Pair 36 |
| 218 ≦ L | Carrying Roller Pairs 35 and 36 |

In the meantime, after a predetermined period has passed since the sensor 64 detected the anterior end of the photosensitive material 24a, the controlling unit 70 releases the nips of the carrying roller pairs 34, 37 to 39, which are disposed at the upstream side of the carrying roller pair 40, when the exposing unit 21 performs the scanning exposure. After that, the carrying roller pair through which the posterior end of photosensitive material 24a has passed is returned to the nip position in order.

For example, the feed length L is divided into ranges shown in Table 2, and only the carrying roller pairs nipping the photosensitive material 24a are released. When the feed length L is less than 151 mm, only the carrying roller pair 39 nips the photosensitive material 24a at the time of scanning exposure, so that only the nip of the carrying roller pair 39 is released. Meanwhile, when the feed length L is 151 mm or more and is less than 217 mm, the carrying roller pairs 38 and 39 nip the photosensitive material 24a, so that the nips of the carrying roller pairs 38 and 39 are released.

When the feed length L is 217 mm or more and is less than 422 mm, the carrying roller pairs 37 to 39 nip the photosensitive material 24a, so that the nips of these carrying roller pairs 37 to 39 are released. When the feed length L is 422 mm or more, the carrying roller pairs 34, 37 to 39 nip the photosensitive material 24a, since the nips of the carrying roller pairs 35 and 36 are released at the time when the skew corrector 50 has corrected the skew. Thus, the nips of the carrying roller pairs 34, 37 to 39 are released. Incidentally, the ranges of the feed length L are determined on the basis of the arrangement intervals of the carrying roller pairs 34 to 41, and may be properly changed.

In this way, when the exposing unit 21 performs the scanning exposure, the nips are released with respect to the carrying roller pairs 34, 37 to 39 disposed at the upstream side of the carrying roller pair 40, and only the carrying roller pairs 40 and 41 carry the photosensitive material 24a in the sub-scanning direction. Thus, it is possible to prevent vibration of peripheral devices from traveling to the photosensitive material 24a through the carrying roller pairs 34 to 39 disposed at the upstream side of the carrying roller pair 40 so that exposure unevenness is prevented from occurring on a recording image.

TABLE 2

| Length L (mm) | Carrying Roller Pair to be nip-released |
|---|---|
| L < 151 | Carrying Roller Pair 39 |
| 151 ≦ L < 217 | Carrying Roller Pairs 38 and 39 |
| 217 ≦ L < 422 | Carrying Roller Pairs 37 to 39 |
| 422 ≦ L | Carrying Roller Pairs 34, 37 to 39 |

FIG. 10 shows timing diagrams explaining the nip-releasing process. As shown in FIG. 10, the controlling unit 70 releases the nip of the carrying roller pair 35 at a moment when a time T15 has passed after detecting the anterior end of the photosensitive material 24a with the sensor 63 and the anterior end has reached the position PB. Successively, the controlling unit 70 releases the nip of the carrying roller pair 36 at a moment when a time T16 has passed and the anterior end of the photosensitive material 24a has reached the position PC.

Moreover, the controlling unit 70 releases the nip of the carrying roller pair 37 at the moment when the anterior end of the photosensitive material 24a has been detected by the sensor 64. Further, the controlling unit 70 releases the nips of the carrying roller pairs 34, 38 and 39 respectively at moments when corresponding times T14, T18 and T19 have passed. Thus, only the carrying roller pairs 40 and 41 carry the photosensitive material 24a while the scanning exposure is performed for the photosensitive material 24a.

After that, the released carrying roller pair through which the posterior end of the photosensitive material 24a has passed is returned to the nip position in order. In other words, the carrying roller pair 35 is returned to the nip position when a time T25 has passed from the detection of the sensor 63, and the carrying roller pair 36 is returned to the nip position when a time T26 has passed. Further, the carrying roller pairs 34, 37, 38 and 39 are respectively returned to the nip position when corresponding times T24, T27, T28 and T29 have passed after detecting the anterior end of the photosensitive material 24a with the sensor 64.

In the above description of the nip-releasing process, the nips of all the carrying roller pairs 34 to 39 are released. However, the nips of the carrying roller pairs may be released in accordance with the feed length L of the photosensitive material 24a. By the way, the times T14 to T29 are determined on the basis of a carrying speed and the arrangement intervals of the carrying roller pairs. The times T14 to T29 may be properly changed.

Moreover, in the above description of the nip releasing process, when the nips of the carrying roller pairs 34, 37 to 39 are released after detecting the anterior end of the photosensitive material 24a with the sensor 64, the release operations are not simultaneously performed and are performed so as to be staggered. This is because that an electric load is prevented from becoming large due to simultaneous activation of plural solenoids. Further, the released carrying roller pairs 35 and 36 are returned to the nip position after the posterior end of the photosensitive material 24a has passed. This nip-releasing operation of the carrying roller pairs 35 and 36 also works to prevent the exposure unevenness. As a result, it is possible to extend lifetimes of the solenoid and so forth, since operation numbers of the release units 75 and 76 are reduced.

Figure 11:
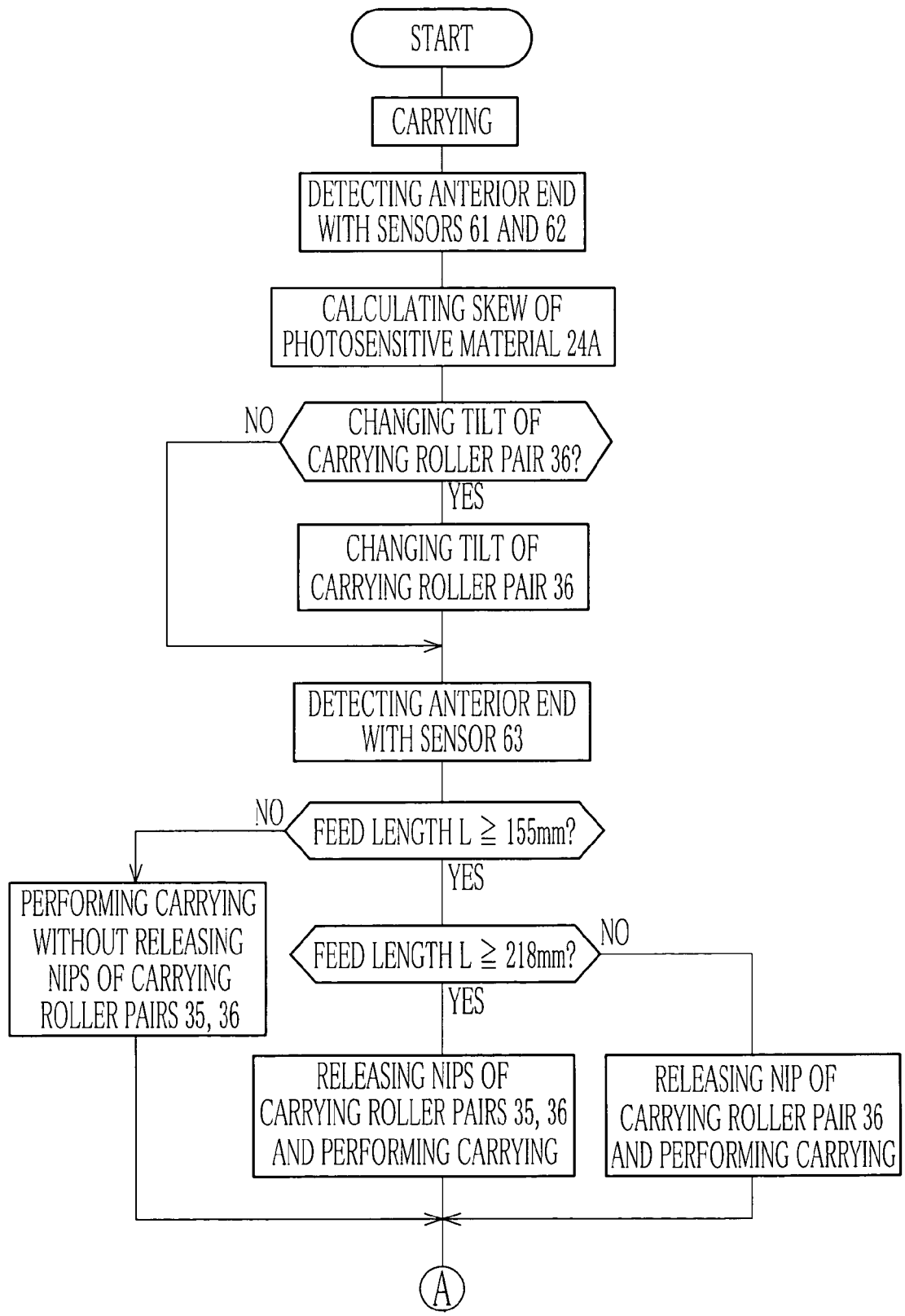
FIG. 11 is a flowchart explaining an operation of the carrying device.
Figure 12:
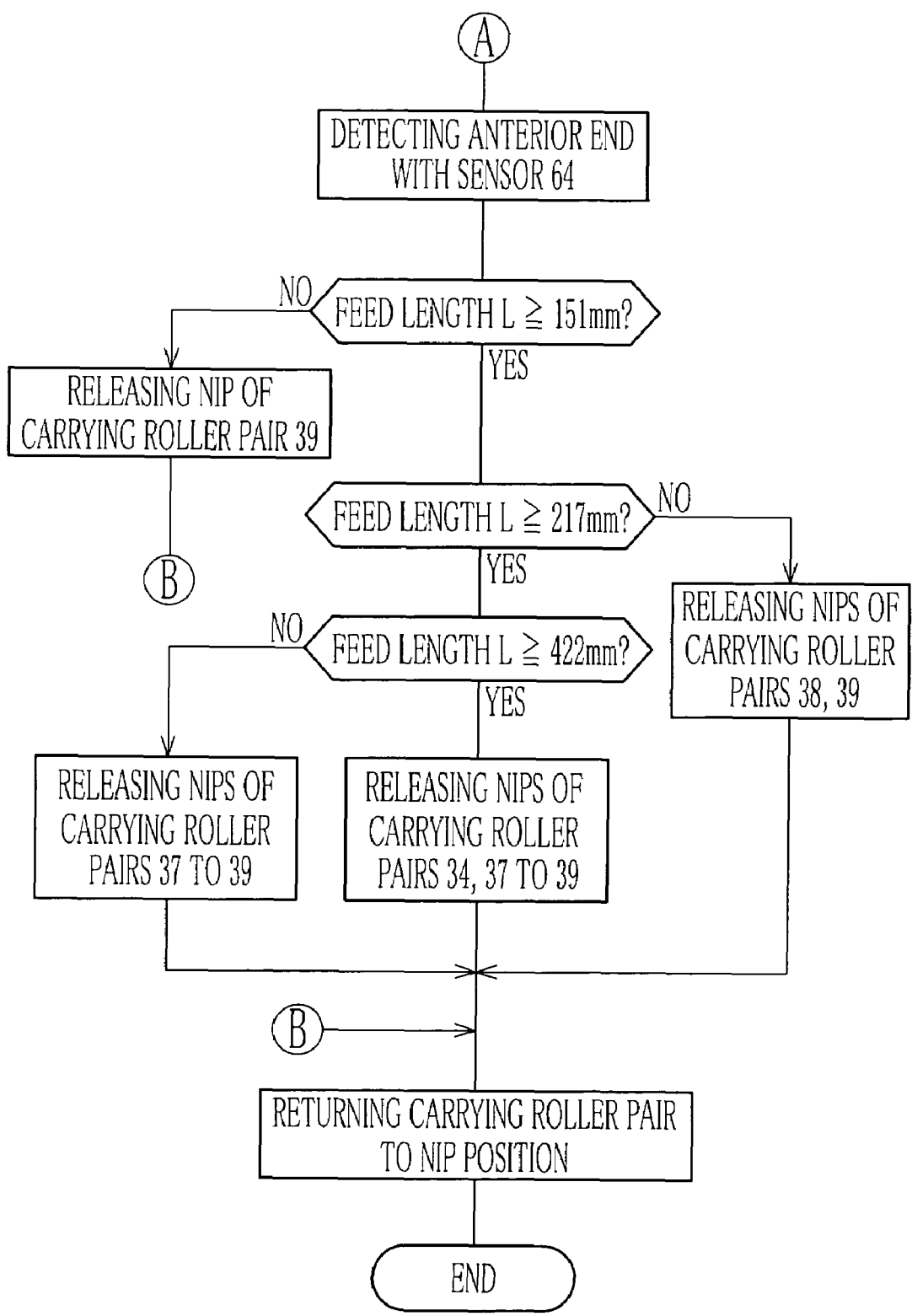
FIG. 12 is a flowchart explaining the operation of the carrying device.

Next, an operation of the carrying device 19 is described below, referring to flowcharts shown in FIGS. 11 and 12. The photosensitive material 24a, for which back printing has been performed by the back-printing unit 18, is forwarded to the carrying device 19. The forwarded photosensitive material 24a is nipped by the carrying roller pair 34 and is carried toward the downstream side along the passage 17.

After that, the anterior end of the photosensitive material 24a reaches the sensors 61 and 62 and is detected thereby. Upon detection of the anterior end, the controlling unit 70 obtains the detection signals from the sensors 61 and 62 to calculate the skew direction and the skew angle of the photosensitive material 24a. On the basis of the calculation result, the controlling unit 70 judges whether the tilt of the current carrying roller pair 36 should be altered or not.

When it is judged that there is no need to alter the tilt of the carrying roller pair 36, the controlling unit 70 avoids altering the tilt of the carrying roller pair 36. In contrast, when it is judged that there is a need to alter the tilt of the carrying roller pair 36, the controlling unit 70 controls the skew corrector 50 on the basis of the calculation result to alter the tilt by rotating the carrying roller pair 36 to a position where the skew of the photosensitive material 24a is corrected.

Successively, the photosensitive material 24a is carried toward the downstream side. After the sensor 63 has detected the anterior end, the controlling unit 70 releases the nips of the carrying roller pairs in order in accordance with the feed length L of the photosensitive material 24a while carrying the photosensitive material 24a.

Briefly, when the feed length L is less than 155 mm, the controlling unit 70 carries the photosensitive material 24a without releasing the nips of the carrying roller pairs 35 and 36. When the feed length L 155 mm or more and is less than 218 mm, the nip of the carrying roller pair 36 is released at the moment when the time T16 has passed after detecting the anterior end with the sensor 63. In this case, the photosensitive material 24a is carried by the carrying roller pairs disposed at the downstream side of the released carrying roller pair 36.

When the feed length L is 218 mm or more, the controlling unit 70 releases the nip of the carrying roller pair 35 at the moment when the time T15 has passed after detecting the anterior end with the sensor 63. Further, the controlling unit 70 releases the nip of the carrying roller pair 36 at the moment when the time T16 has passed after detecting the anterior end with the sensor 63. The photosensitive material 24*a* is carried by the carrying roller pairs disposed at the downstream side of the released carrying roller pair. Incidentally, the nips of the carrying roller pairs 35 and 36 are not simultaneously released in this embodiment, but may be simultaneously released.

After the anterior end of the photosensitive material 24*a* has been detected by the sensor 64, the controlling unit 70 sequentially releases the nips of the carrying roller pairs in accordance with the feed length L of the photosensitive material 24*a*. Concretely, when the fed length L is less than 151 mm, the nip of the carrying roller pair 39 is released at the moment when the time T19 has passed after detecting the anterior end with the sensor 64. When the feed length L is 151 mm or more and is less than 217 mm, the nip of the carrying roller pair 38 is released at the moment when the time T18 has passed after detecting the anterior end with the sensor 64, and the nip of the carrying roller pair 39 is released at the moment when the time T19 has passed after the detection of the sensor 64.

When the feed length L is 217 mm or more and is less than 422 mm, the nip of the carrying roller pair 37 is released at the same moment when the sensor 64 has detected the anterior end. After detecting the anterior end with the sensor 64, the nip of the carrying roller pair 38 is released at the moment when the time T18 has passed, and the nip of the carrying roller pair 39 is released at the moment when the time T19 has passed.

When the feed length L is 422 mm or more, the nip of the carrying roller pair 37 is released at the same moment when the sensor 64 has detected the anterior end. Further, after detecting the anterior end with the sensor 64, the nips of the carrying roller pairs 34, 38 and 39 are released in this order at the moments when the times T14, T18 and T19 have passed. In this way, the nip of the carrying roller pair 34 is released after releasing the nip of the carrying roller pair 37 in the case that the feed length L is 422 mm or more. If the nip of the carrying roller pair 34, which is adjacent to the back-printing unit 18, is released while the back-printing unit 18 performs printing on the photosensitive material 24*a*, bad influence is affected to the printing. For example, the printing is diagonally performed.

After that, the nip-released carrying roller pair through which the posterior end has passed is returned to the nip position in order by the controlling unit 70. Concretely, after detecting the anterior end with the sensor 63, the carrying roller pair 35 is returned to the nip position at the moment when the time T25 has passed, and the carrying roller pair 36 is returned to the nip position at the moment when the time T26 has passed. Further, after detecting the anterior end with the sensor 64, the carrying roller pairs 34, 37, 38 and 39 are respectively returned to the nip position in order at the moments when the corresponding times T24, T27, T28 and T29 have passed.

By the way, in the above description of the operation, the nips of the carrying roller pairs 35 and 36 are released in accordance with the feed length L. However, when the photosensitive material 24*a* has no skew in the feeding direction, the nips of the carrying roller pairs 35 and 36 may not be released. In this case, the nips of the carrying roller pairs 35 and 36 may be released when the nips of the carrying roller pairs 34, 37 to 39 are released after detecting the anterior end of the photosensitive material 24*a* with the sensor 64.

In this way, the nips of the carrying roller pairs 35 and 36 are released in accordance with the feed length L when the photosensitive material 24*a* has the skew relative to the carrying center CL1. Since the photosensitive material 24*a* is carried by the carrying roller pairs disposed at the downstream side of the nip-released carrying roller pair, it is possible to prevent the force of the carrying roller pairs 35 and 36 from being applied to the posterior end of the photosensitive material 24*a* in the carrying direction. Thus, the skew-correction amount of the skew corrector 50 is prevented from reducing so that the skew of the photosensitive material 24*a* is surely corrected.

In the above embodiment, the described release units 74 to 79 comprise the solenoid. The release unit, however, may comprise a pulse motor for releasing the nip of the carrying roller pair. Incidentally, only the release units 75 and 76 may be disposed without disposing the release units 74, 77 to 79 to merely release the nips of the carrying roller pairs 35 and 36.

Moreover, in the above embodiment, one of the rollers constituting the carrying roller pair is separated from the other roller to release the nip of the carrying roller pair. However, this is not exclusive. A nip-force releasing state may be set without separating one of the rollers from the other thereof so as to substantially make the nip force zero or so as to reduce the nip force in comparison with the normal nip force. In other words, it is sufficient that the carrying force to be applied to the photosensitive material 24*a* is removed or reduced.

Further, in the above embodiment, the skew corrector 50 is disposed at the curving portion of the passage 17. The skew correction 50, however, may be disposed at the plane portion of the passage 17. The position for disposing the skew corrector 50 is not limited on condition that this position is located at the upstream side of the exposing unit 21. Moreover, in the above embodiment, the skew corrector 50 tilts the carrying roller pair 36 from the reference position, which is parallel to the width direction of the passage 17, to make the passage lengths different at both ends of the passage 17 in the width direction. However, this is not exclusive. It is sufficient to make the passage lengths at both ends of the passage 17. For example, the difference between the passage lengths may be caused by tilting the guide member constituting the passage 17. In another way, the difference between the passage lengths may be caused by tilting both of the carrying roller pair 36 and the guide member.

Figure 13:
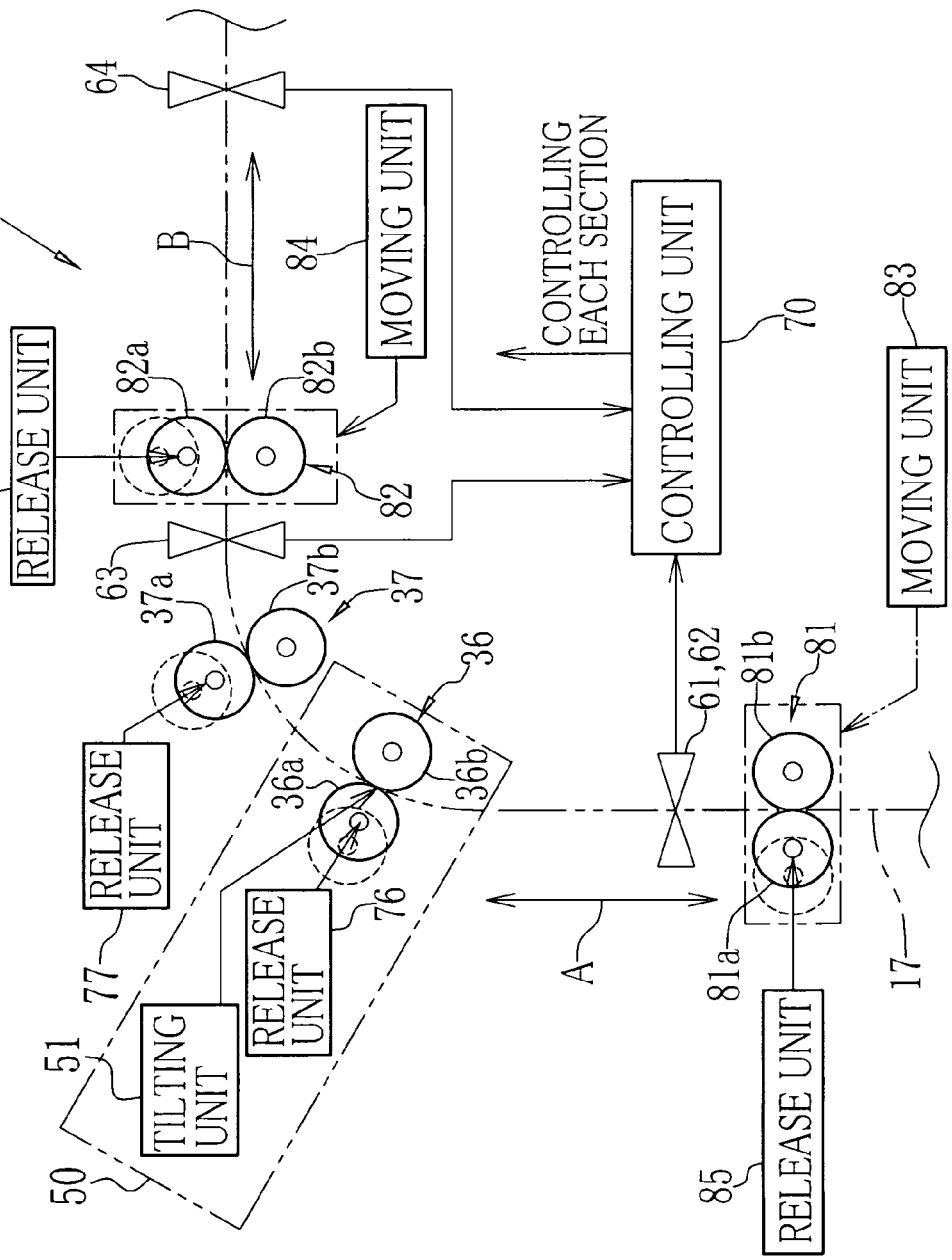
FIG. 13 is a schematic side view showing a structure of the carrying device in which a roller pair and a moving unit are employed as a carrier.

Furthermore, in the above embodiment, the carrying roller pair is employed as the carrier of the carrying device 19. However, this is not exclusive. FIG. 13 shows another carrying device 80 in which the skew corrector 50 and the carrying roller pair 37 are disposed at the curving portion of the passage 17, similarly to the carrying device 19. Further, a roller pair 81 is disposed at the upstream side of the curving portion, and a roller pair 82 is disposed at the downstream side thereof. The roller pairs 81 and 82 are provided with moving units 83 and 84 respectively. For instance, the respective moving units 83 and 84 are constituted with a belt to be rotated by a motor, a rack, a pinion, a solenoid, an air cylinder and so forth.

By means of the moving units 83 and 84, the respective roller pairs 81 and 82 are moved along the passage 17 in the upstream and downstream directions. The photosensitive material 24*a* is carried along the passage 17 upon moving the roller pairs 81 and 82 by the moving units 83 and 84 in a state that the photosensitive material 24*a* is nipped by the roller pairs 81 and 82.

The roller pair 81 is constituted with rollers 81*a* and 81*b*, and the roller pairs 82 is constituted with rollers 82*a* and 82*b*. The roller pairs 81 and 82 are provided with release units 85 and 86 respectively. The release units 85 and 86 have a similar structure with the foregoing release units 74 to 79, and the rollers 81a and 82a are moved from a nip position (shown by a solid line) to a release position (shown by a dotted line) to release the nip. In FIG. 13, a component being identical with that of the carrying device 19 is denoted by the same reference numeral, and detailed description thereof is abbreviated.

Incidentally, although the roller pairs 81 and 82 are disposed for nipping the photosensitive material 24a, it is possible to employ anything except the roller pair on condition that the photosensitive material 24a is nipped.

Figure 14:
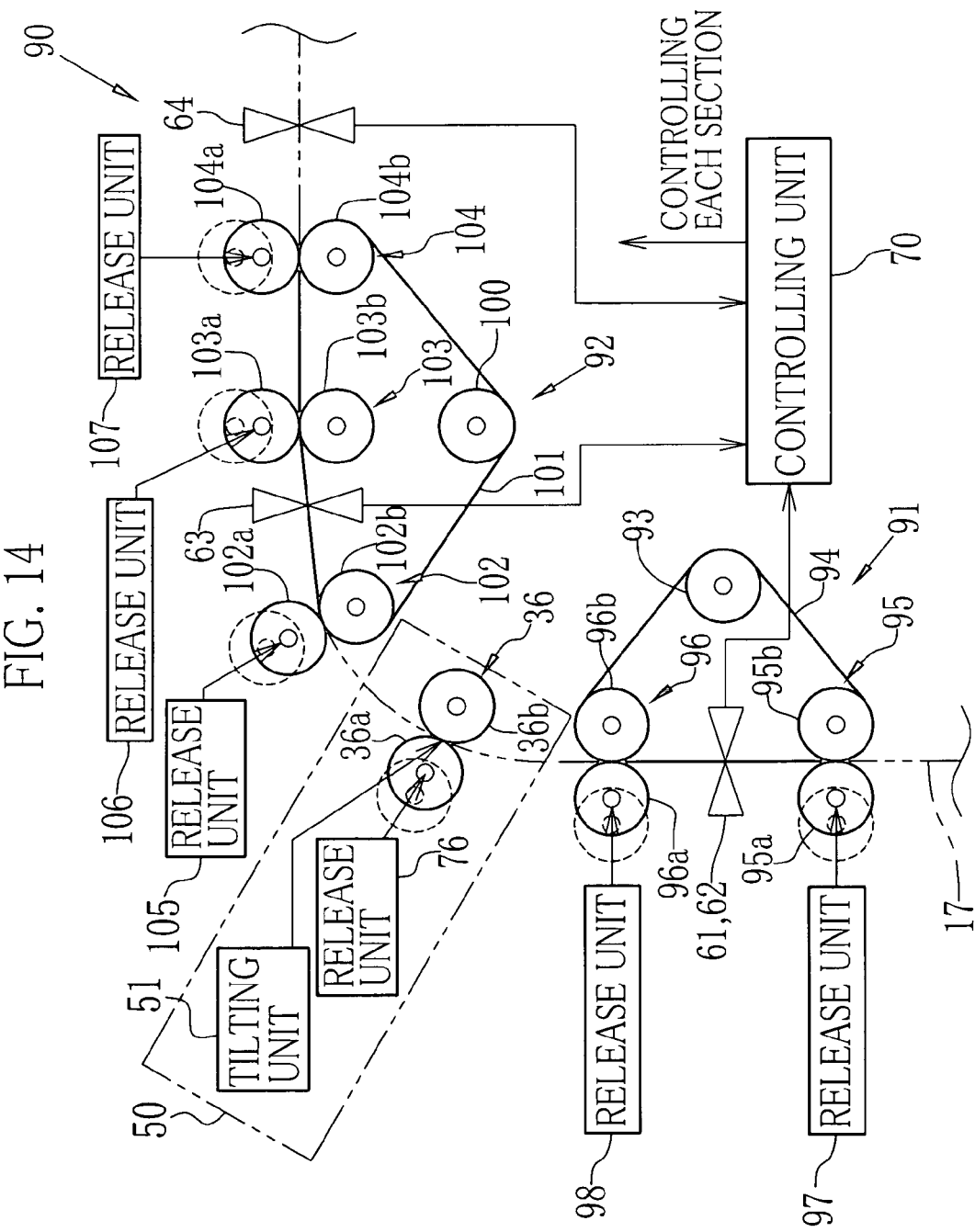
FIG. 14 is a schematic side view showing a structure of the carrying device in which a belt conveyor is employed as a carrier.

Meanwhile, in a carrying device 90 shown in FIG. 14, the skew corrector 50 is disposed at the curving portion of the passage 17, similarly to the above carrying devices 19 and 80. Further, a belt conveyor 91 is disposed at the upstream side of the skew corrector 50, and a belt conveyor 92 is disposed at the downstream side thereof.

The belt conveyor 91 is constituted with a driving roller 93, a belt 94 and driven roller pairs 95 and 96. The driving roller 93 is rotated by a motor not shown to revolve the belt 94. The driven roller pairs 95 and 96 nip the belt 94 and is rotated in association with the revolution of the belt 94.

The driven roller pair 95 includes a roller 95a disposed at the outside of the belt 94, and a roller 95b disposed at the inside thereof. Similarly, the driven roller pair 96 includes two rollers 96a and 96b. The photosensitive material 24a is nipped between the belt 94 and the rollers 95a and 96a, and is carried along the passage 17 in association with the revolution of the belt 94.

The roller 95a is moved by a release unit 97 between a nip position (shown by a solid line) and a release position (shown by a dotted line). The roller 95a is moved to the release position to release the nip of the roller 95a and the belt 94. Similarly, when the roller 96a is moved by a release unit 98 to a release position shown by a dotted line, the nip of the roller 96a and the belt 94 is released.

The belt conveyor 92 has a similar structure with the belt conveyor 91 and is constituted with a driving roller 100, a belt 101 and driven roller pairs 102, 103 and 104. A number of the disposed driven roller pairs is greater by one in comparison with the belt conveyor 91.

Rollers 102a, 103a and 104a of the driven roller pairs 102, 103 and 104, which are disposed at the outside of the belt 101, are respectively moved by release units 105, 106 and 107 between a nip position (shown by a solid line) and a release position (shown by a dotted line). When the rollers 102a, 103a and 104a are moved to the release position, the nip is released. In FIG. 14, a component being identical with that of the carrying device 19 is denoted by the same reference numeral, and detailed description thereof is abbreviated.

Although the belt conveyors 91 and 92 are provided with the driven roller pairs, this is not exclusive. A driven roller may be merely disposed at the inside of the belt without disposing a roller at the outside of the belt. In this case, a large number of suction holes may be formed in the belt to suck the photosensitive material 24a. Alternatively, the photosensitive material 24a may be drawn to the belt by electrostatic force. In the cases adopting these structures, the suction force and the electrostatic force may be properly changed in order to control the carrying force to be applied to the photosensitive material 24a.

In the foregoing embodiment, the controlling unit 70 controls the respective sections of the carrying device 19. However, this is not exclusive. Instead of the controlling unit 70, the system controller 23 for controlling the entire photographic printer 10 may control the carrying device 19.

Further, in the foregoing embodiment, the present invention is adopted to the photographic printer. However, this is not exclusive. The present invention is applicable to an ink-jet printer, a thermal printer and so forth in which a sheet material is carried.

Furthermore, in the foregoing embodiment, the photosensitive material is used as the sheet material. However, this is not exclusive. It is possible to use a plain paper, a thermosensitive paper and so forth having a cut-sheet shape.

EXAMPLE

As described above, in the carrying device 19, the roll widths of the carrying roller pairs 34 to 39 are narrower than the shortest width of the photosensitive material to be used in the photographic printer 10. Thus, the skew-correction properties of the skew corrector 50 are independent of the widths of the photosensitive materials 24a. In view of this, is described below only a case in that the photosensitive material having a width size of 89 mm is used.

Figure 15:
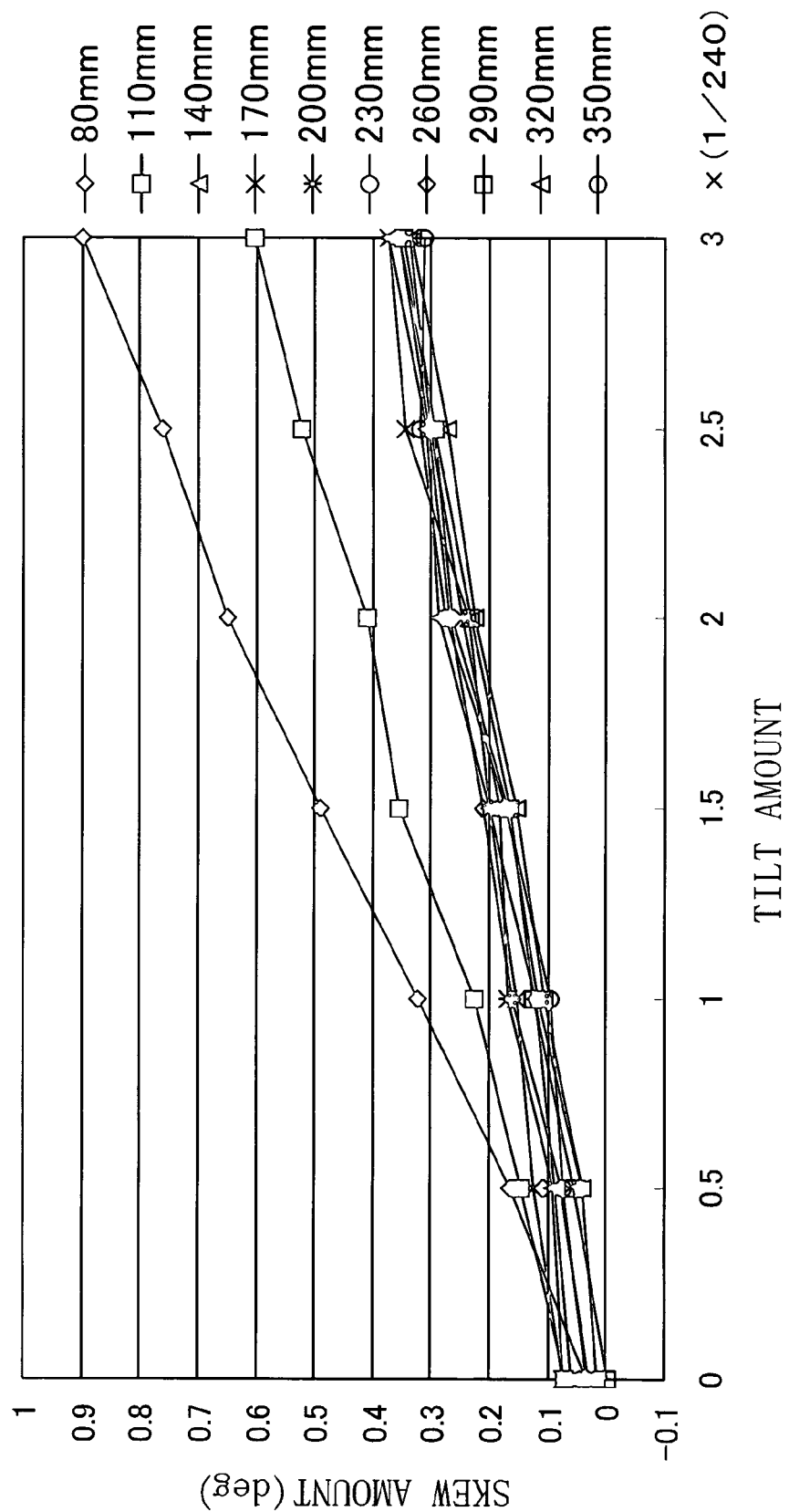
FIG. 15 is a graph showing a relationship between a tilt amount and a skew amount in a case that the nip of the carrying roller pair is released.

FIG. 15 is a graph showing relationships between tilt amounts and skew amounts in a case that the nips of the carrying roller pairs 35 and 36 are released in accordance with the feed lengths L (ten sorts of 80 mm to 350 mm) of the photosensitive materials 24a. The horizontal axis represents the tilt amounts of the carrying roller pair 36. The vertical axis represents angles (deg.) of the photosensitive material 24a skewed by the carrying roller pair 36.

When the distance from the fulcrum PA to the edge of the carrying roller pair 36 is 240 mm, the tilt amount of the horizontal axis means a value of a tilt position X(mm) divided by the distance 240 mm (X(mm)/240 mm), wherein the tilt position X is a movement position of the edge relative to the reference position where the carrying roller pair 36 is parallel to the width direction of the passage 17. In other words, the tilt amount is a value of tan θ at a time when the carrying roller pair 36 is tilted by a little angle θ from the reference position to the tilt position X.

Figure 16:
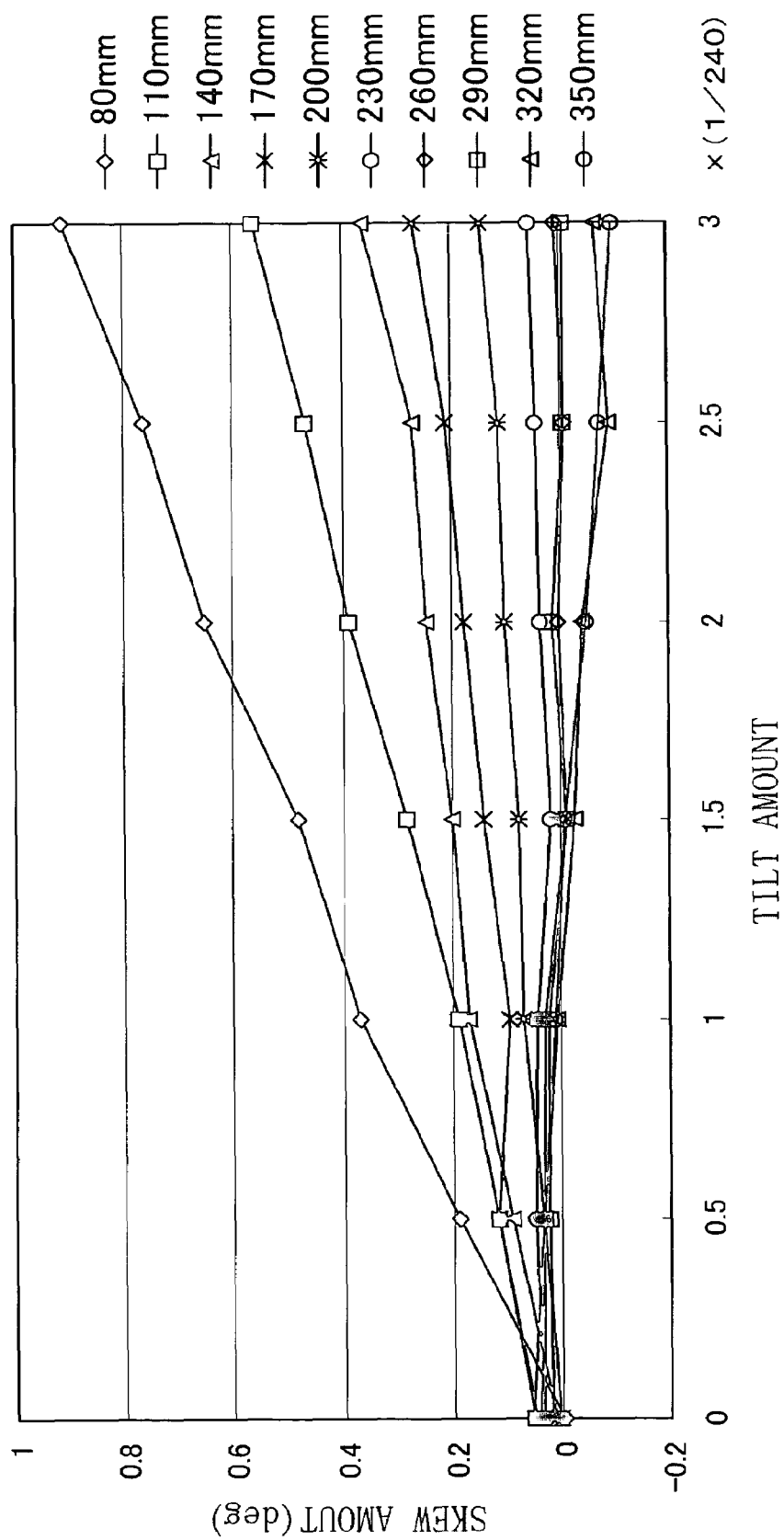
FIG. 16 is a graph showing a relationship between a tilt amount and a skew amount in a case that the nip of the carrying roller pair is not released.

As a comparative example, a graph of FIG. 16 shows relationships between tilt amounts and skew amounts in a case that the photosensitive material is carried without releasing the nips of the carrying roller pairs 35 and 36. Incidentally, the other conditions are same with those of the case releasing the nips.

Such as shown in FIG. 16, in the case that the photosensitive material is carried without releasing the nips of the carrying roller pairs 35 and 36, an increasing rate of the skew amount (deg.) relative to an increase of the tilt amount becomes smaller as the feed length L becomes longer. In particular, when the feed length L is 260 mm and 290 mm, the skew amount hardly changes even if the tilt amount increases. This means that the photosensitive material 24a does not incline. Further, when the feed length L is 320 mm and 350 mm, the skew amount becomes minus as the tilt amount increases. This means that the photosensitive material 24a inclines in a reverse direction.

Such as shown in FIG. 15, in the case that the nips of the carrying roller pairs 35 and 36 are released, the increasing rate of the skew amount (deg.) relative to the increase of the tilt amount becomes smaller with respect to the feed length L of 80 mm to 200 mm as the feed length L becomes longer. However, regarding the feed length L of 230 mm to 350 mm, the increasing rate is substantially same with that of the feed length L of 200 mm. This means that the skew amount increases in association with the increase of the tilt amount even if the feed length L becomes longer. In other words, it is possible to correct the skew of the photosensitive material 24a by increasing the tilt amount of the carrying roller pair 36 even if the feed length L becomes longer.

Figure 17:
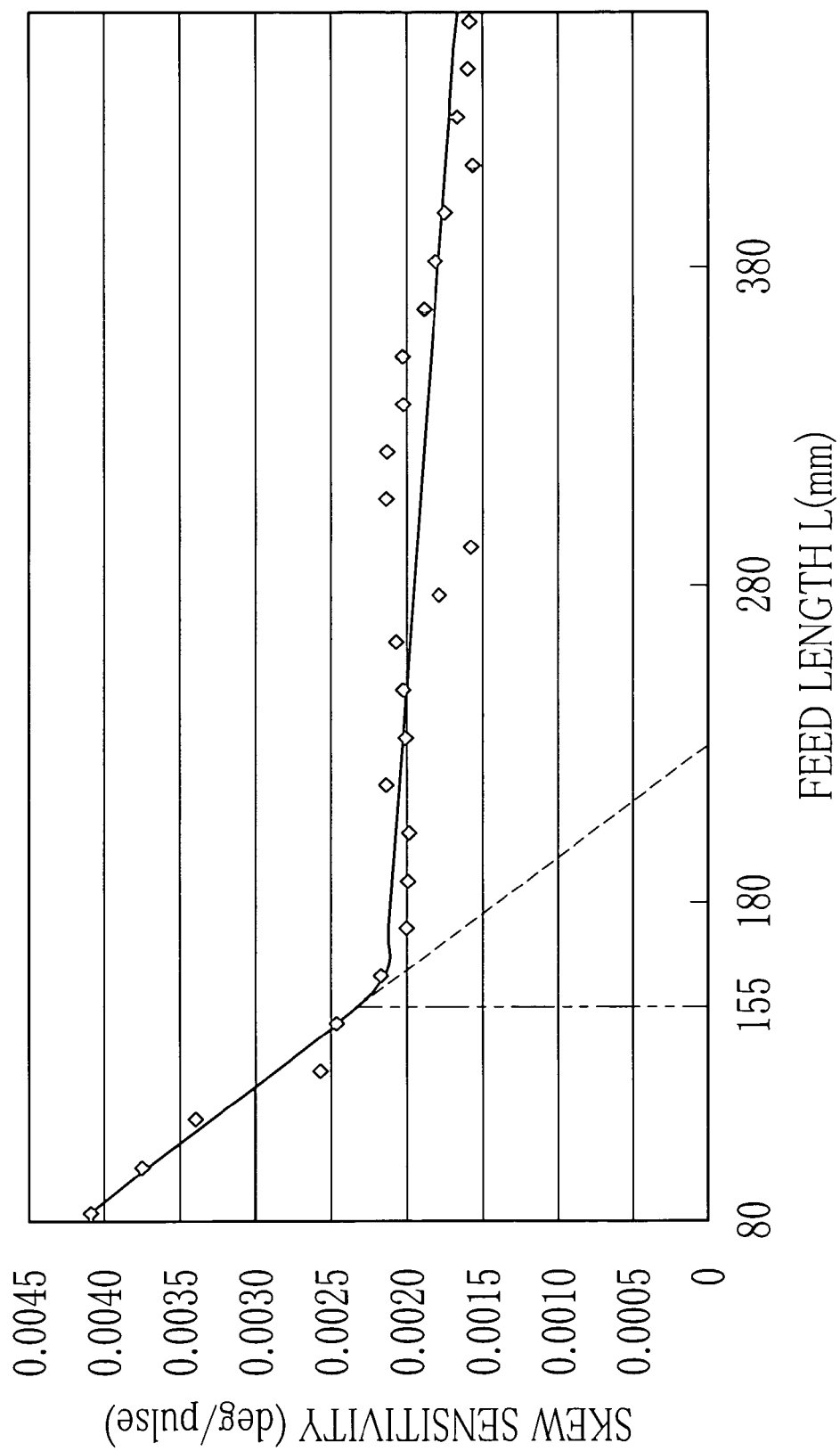
FIG. 17 is a graph showing a relationship between a feed length and a skew sensitivity.

FIG. 17 is a graph showing a relationship between the feed lengths L(mm) and skew sensitivity (deg./pulse). The horizontal axis represents the feed length L(mm). The vertical axis represents the skew sensitivity (deg./pulse). The skew sensitivity is the skew angle (deg.) of the photosensitive material 24*a* at a time when a tilt driving motor, which is a pulse motor, is rotated by one pulse to tilt the carrying roller pair 36 from the reference position.

A solid line in FIG. 17 shows a skew-sensitivity characteristic in the case that the nips of the carrying roller pairs 35 and 36 are released for the photosensitive material 24*a* whose feed length L is 155 mm or more. Meanwhile, a dotted line in this drawing shows a skew-sensitivity characteristic in the case that the photosensitive material 24*a* whose feed length L is 155 mm or more is carried without releasing the nips of the carrying roller pairs 35 and 36. From this graph, it is known that the skew sensitivity (deg./pulse) rapidly declines in association with the increase of the feed length L when the feed length L is 80 mm or more and is less than 155 mm. However, when the feed length L is 80 mm or more and is less than 155 mm, it is possible by increasing the tilt amount of the carrying roller pair 36 to correct the skew of the photosensitive material 24*a* without releasing the nip.

In the case that the nip is not released, the skew sensitivity directly and rapidly declines when the feed length L is 155 mm or more, and the skew sensitivity becomes zero when the feed length L is 230 mm or more. This means that it is impossible to correct the skew of the photosensitive material 24*a*. In the case that the nip is released, the skew sensitivity declines in association with the increase of the feed length L when the feed length L is 155 mm or more. However, a declining rate of the skew sensitivity is smaller in comparison with the case in that the nip is not released. Thus, even if the feed length L is 380 mm or more, it is possible to correct the skew of the photosensitive material 24*a* by increasing the tilt amount. Incidentally, it is understood that a continuity of the skew sensitivity (the skew-correction properties of the skew corrector) is maintained when the fed length L is about 155 mm (reference length LA).

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A sheet carrying device for carrying a sheet along a passage, said sheet carrying device correcting a skew of said sheet relative to a carrying direction thereof while carrying said sheet, said sheet carrying device comprising:
    a skew corrector for correcting the skew of said sheet by making passage lengths different at both ends of said passage in a width direction thereof;
    a first carrying roller pair included in said skew corrector, where the first carrying roller pair is located at a curving portion of said passage;
    a second carrying roller pair located at a planar portion of said passage;
    carriers disposed at upstream and downstream sides of said skew corrector to carry said sheet along said passage;
    the skew corrector for performing one of removal and reduction of a carrying force to be applied to said sheet by said upstream carrier; and
    a controller for controlling said first carrying-force changer skew corrector after an anterior end of said sheet has reached said downstream carrier and a carrying force has been applied to said sheet,
    wherein said skew corrector tilts the first carrying roller pair from a reference position, which is parallel to the width direction of said passage, on a plane perpendicular to said passage to make said passage lengths different at both ends of said passage in the width direction and switching a first roller of said first carrying roller pair between a nip state and a nip-force releasing state,
    wherein a protrusion amount of a first roller of the second carrying roller pair is greater than a protrusion amount of a second roller of the second carrying roller pair, where a protrusion amount is a distance between a guide member and a nip surface of a roller that the nip surface of the roller protrudes the distance into said guide member, and
    wherein a protrusion amount of the first roller of the first carrying roller pair located at the curving portion of said passage is smaller than the protrusion amount of the first roller of the second carrying roller pair located at the planar portion of said passage.

2. A sheet carrying device according to claim 1, wherein said upstream carrier includes at least second and third carrying roller pairs for nipping and carrying said sheet, and said first skew corrector individually switches said second and third carrying roller pairs between a nip state and a nip-force releasing state.

3. A sheet carrying device according to claim 2, wherein said controller controls said skew corrector on the basis of a length of said sheet in the carrying direction to change said carrying roller pairs to be set to the nip-force releasing state in accordance with said length of the sheet.

4. A sheet carrying device according to claim 2, wherein said sheet is one of a first sheet and a second sheet, which has a longer length in the carrying direction in comparison with a length of said first sheet,
    wherein said skew corrector avoid setting said carrying roller pairs in the nip-force releasing state while said first sheet is carried.

5. A sheet carrying device according to claim 4, wherein a reference length is defined as a length exceeding the length of said first sheet in the carrying direction, and carrying roller pairs of said upstream carrier nipping the second sheet are set in the nip-force releasing state in an order of moments when a distance from an anterior end of said second sheet has coincided with said reference length after the anterior end of said second sheet has passed through said downstream carrier.

6. A sheet carrying device according to claim 2, wherein said skew corrector return said carrying roller pairs, which are kept in said nip-force releasing state, to said nip state in order from the carrying roller pair through which a posterior end of said sheet has passed.

7. A sheet carrying device according to claim 6, wherein said skew corrector set the respective carrying roller pairs in said nip-force releasing state by moving one roller of said carrying roller pair in a direction separating from the other roller, and said first and second carrying-force changers set the respective carrying roller pairs in said nip state by moving one roller of said carrying roller pair toward the other roller.

8. A sheet carrying device according to claim 7, wherein said passage has an arc-shaped curving portion between said carriers, and said skew corrector is disposed at said curving portion.

9. A sheet carrying device according to claim 8, wherein said downstream carrier includes at least one downstream carrying roller pair for nipping and carrying said sheet.

10. A sheet carrying device according to claim 1, wherein said upstream carrier includes:
- a first moving unit for moving said second carrying roller pair along said passage, said sheet being carried in a state nipped by said second carrying roller pair.

11. A sheet carrying device according to claim 10, wherein said skew corrector sets the second carrying roller pair in said nip-force releasing state by moving one roller of said second carrying roller pair in a direction separating from the other roller, and said first skew corrector sets the second carrying roller pair in said nip state by moving one roller of said second carrying roller pair toward the other roller.

12. A sheet carrying device according to claim 11, wherein said downstream carrier includes:
- a third carrying roller pair for nipping and carrying said sheet; and
- a second moving unit for moving said third carrying roller pair along said passage, said sheet being carried in a state nipped by said third carrying roller pair.

13. A sheet carrying device according to claim 1, wherein said upstream carrier includes:
- a plurality of upstream driven roller pairs for nipping and carrying said sheet, said upstream driven roller pair being switched by said first skew corrector between a nip state and a nip-force releasing state;
- a first belt supported by said upstream driven roller pairs, which are rotated in association with said first belt; and
- a first driving roller for driving said first belt.

14. A sheet carrying device according to claim 13, wherein said first skew corrector sets the upstream driven roller pair in said nip-force releasing state by moving one roller of said upstream driven roller pair in a direction separating from the other roller, and said first skew corrector sets the upstream driven roller pair in said nip state by moving one roller of said upstream driven roller pair toward the other roller.

15. A sheet carrying device according to claim 14, wherein said downstream carrier includes:
- a plurality of downstream driven roller pairs for nipping and carrying said sheet;
- a second belt supported by said downstream driven roller pairs, which are rotated in association with said second belt; and
- a second driving roller for driving said second belt.

* * * * *